United States Patent
Zhang et al.

(10) Patent No.: US 12,369,063 B2
(45) Date of Patent: Jul. 22, 2025

(54) PER-RESOURCE TYPE CROSS LINK INTERFERENCE REFERENCE SIGNAL CONFIGURATION

(71) Applicant: QUALCOMM Incorporated, San Diego, CA (US)

(72) Inventors: Qian Zhang, Basking Ridge, NJ (US); Wanshi Chen, San Diego, CA (US); Muhammad Sayed Khairy Abdelghaffar, San Jose, CA (US); Yan Zhou, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 409 days.

(21) Appl. No.: 18/069,211

(22) Filed: Dec. 20, 2022

(65) Prior Publication Data
US 2024/0205712 A1    Jun. 20, 2024

(51) Int. Cl.
*H04W 24/10* (2009.01)
*H04B 17/336* (2015.01)
*H04L 5/14* (2006.01)

(52) U.S. Cl.
CPC .......... *H04W 24/10* (2013.01); *H04B 17/336* (2015.01); *H04L 5/14* (2013.01)

(58) Field of Classification Search
CPC .............................. H04W 24/10; H04B 17/336
See application file for complete search history.

(56) References Cited

U.S. PATENT DOCUMENTS

| | | | |
|---|---|---|---|
| 2023/0130732 A1 | 4/2023 | Ibrahim et al. | |
| 2023/0421222 A1* | 12/2023 | Chatterjee | H04B 7/0626 |
| 2024/0039655 A1* | 2/2024 | Rudolf | H04L 1/0016 |
| 2024/0146425 A1* | 5/2024 | Fakoorian | H04W 76/20 |

OTHER PUBLICATIONS

International Search Report and Written Opinion—PCT/US2023/077908—ISA/EPO—Feb. 23, 2024 (2300863WO).
Samsung: "Dynamic and flexible TDD for NR duplex evolution", 3GPP TSG-RAN WG1 Meeting #110bis-e, R1-2209730, 3rd Generation Partnership Project (3GPP), Mobile Competence Centre, 650, Route Des Lucioles, F-06921 Sophia-Antipolis Cedex, France, vol. RAN WG1, No. e-Meeting, Oct. 10, 2022-Oct. 19, 2022, Sep. 30, 2022, XP052259203, 10 Pages, p. 3-p. 6, figure 2.

* cited by examiner

*Primary Examiner* — Zhiren Qin
(74) *Attorney, Agent, or Firm* — Holland & Hart LLP

(57) ABSTRACT

Methods, systems, and devices for wireless communication are described. A wireless communication device (e.g., a user equipment (UE)) may receive information indicative of sets of resources for performing a cross link interference (CLI) measurement during one or more subband full-duplex (SBFD) symbols or one or more non-SBFD symbols. Additionally, the information may indicate additional sets of resources for reporting results of the CLI measurement. The wireless communication device may perform the CLI measurement using one of the sets of resources based on whether the CLI measurement is performed in one or more SBFD symbols or one or more non-SBFD symbols. In some examples, the wireless communication device may transmit a report indicating the results of the CLI measurement using a respective additional set of resources.

30 Claims, 13 Drawing Sheets

PER-RESOURCE TYPE CROSS LINK INTERFERENCE REFERENCE SIGNAL CONFIGURATION

FIELD OF TECHNOLOGY

The following relates to wireless communication, including configurations for per-resource type cross link interference (CLI) reference signal measurement and reporting.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE).

Some wireless devices, such as network entities (e.g., gNodeBs) may support subband full-duplex (SBFD) communications, which may support simultaneous transmission and reception of downlink and uplink transmissions on a subband basis. UEs may typically support half-duplex communications. Nevertheless, SBFD communications with a network entity may generate cross link interference (CLI) that affects either UEs or network entities. The causes and amount of CLI observed may differ for SBFD symbols and non-SBFD symbols.

SUMMARY

The described techniques relate to improved methods, systems, devices, and apparatuses that support per-resource type cross link interference (CLI) reference signal configurations. For example, the described techniques provide for separate CLI measurement and reporting procedures based on whether the measured CLI occurs during subband full-duplex (SBFD) symbols or non-SBFD symbols. In some examples, user equipments (UEs) experiencing inter-UE CLI, network entities experiencing inter-gNB CLI, or both may use the different CLI measurement and reporting procedures. In such cases, a wireless device (e.g., a UE, a network entity) may receive signaling indicating sets of resources (e.g., resource configurations) for performing CLI measurements during one or more SBFD symbols or non-SBFD symbols. The sets of resources may differ based on whether the CLI is observed during the SBFD symbols or the non-SBFD symbols. In addition, sets of resources the wireless device may use for reporting CLI measurements may vary. In some examples, the different sets of resources may include more CLI resources for SBFD symbols than for non-SBFD symbols. Additionally, a set of resources for non-SBFD symbols may allocate more resources to account for misaligned time division duplexing (TDD) cells than for aligned TDD cells.

A method for wireless communication at a wireless communication device is described. The method may include receiving first information indicative of a first set of resources for performing a CLI measurement during one or more SBFD symbols, receiving second information indicative of a second set of resources for performing a CLI measurement during one or more non-SBFD symbols, and performing the CLI measurement using the first set of resources or the second set of resources based on a type of symbol in which the CLI measurement is performed, where the type of symbol is a SBFD symbol or a non-subband full duplex symbol.

An apparatus for wireless communication at a wireless communication device is described. The apparatus may include a processor, memory coupled with the processor, and instructions stored in the memory. The instructions may be executable by the processor to cause the apparatus to receive first information indicative of a first set of resources for performing a CLI measurement during one or more SBFD symbols, receive second information indicative of a second set of resources for performing a CLI measurement during one or more non-SBFD symbols, and perform the CLI measurement using the first set of resources or the second set of resources based on a type of symbol in which the CLI measurement is performed, where the type of symbol is a SBFD symbol or a non-subband full duplex symbol.

Another apparatus for wireless communication at a wireless communication device is described. The apparatus may include means for receiving first information indicative of a first set of resources for performing a CLI measurement during one or more SBFD symbols, means for receiving second information indicative of a second set of resources for performing a CLI measurement during one or more non-SBFD symbols, and means for performing the CLI measurement using the first set of resources or the second set of resources based on a type of symbol in which the CLI measurement is performed, where the type of symbol is a SBFD symbol or a non-subband full duplex symbol.

A non-transitory computer-readable medium storing code for wireless communication at a wireless communication device is described. The code may include instructions executable by a processor to receive first information indicative of a first set of resources for performing a CLI measurement during one or more SBFD symbols, receive second information indicative of a second set of resources for performing a CLI measurement during one or more non-SBFD symbols, and perform the CLI measurement using the first set of resources or the second set of resources based on a type of symbol in which the CLI measurement is performed, where the type of symbol is a SBFD symbol or a non-subband full duplex symbol.

Some examples of the method, apparatuses, and non-transitory computer-readable medium described herein may further include operations, features, means, or instructions for receiving the first information indicative of a first additional set of resources for reporting a result of the CLI measurement during the one or more SBFD symbols and receiving the second information indicative of a second additional set of resources for reporting a result of the CLI measurement during the one or more non-SBFD symbols.

In some examples of the method, apparatuses, and non-transitory computer-readable medium described herein, the wireless communication device may be a user equipment (UE) that supports half-duplex communications, and where the first information and the second information may be received from a network entity that supports SBFD operation.

Some examples of the method, apparatuses, and non-transitory computer-readable medium described herein may further include operations, features, means, or instructions for transmitting a report indicating a result of the CLI measurement using the first additional set of resources or the second additional set of resources based on the type of symbol in which the CLI measurement may be performed.

In some examples of the method, apparatuses, and non-transitory computer-readable medium described herein, performing the CLI measurement may include operations, features, means, or instructions for performing at least one of a reference signal strength indicator (RSSI) measurement or a signal interference-to-noise (SINR) measurement for one or more downlink subbands in a SBFD symbol to measure CLI arising from inter-subband leakage due to an uplink transmission from a neighboring wireless communication device during the SBFD symbol and performing at least one of an RSSI measurement or a reference signal received power (RSRP) measurement for one or more uplink subbands in the SBFD symbol to measure intra-subband CLI arising from the uplink transmission, where the wireless communication device may be a UE.

In some examples of the method, apparatuses, and non-transitory computer-readable medium described herein, performing the CLI measurement may include operations, features, means, or instructions for performing at least one of an RSSI measurement or a SINR measurement for one or more uplink subbands in a SBFD symbol to measure CLI arising from inter-subband leakage due to a downlink transmission from a neighboring wireless communication device during the SBFD symbol and performing at least one of an RSSI measurement or an RSRP measurement for one or more downlink subbands in the SBFD symbol to measure intra-subband CLI arising from the downlink transmission, where the wireless communication device may be a network entity.

In some examples of the method, apparatuses, and non-transitory computer-readable medium described herein, performing the CLI measurement may include operations, features, means, or instructions for performing the CLI measurement during a non-SBFD symbol based on a misalignment of time division duplex formats applied by the wireless communication device and one or more additional wireless communication devices during the non-SBFD symbol.

In some examples of the method, apparatuses, and non-transitory computer-readable medium described herein, an amount of the second set of resources allocated for performing the CLI measurement during a non-SBFD symbol may be based on whether time division duplex formats applied by the wireless communication device and one or more additional wireless communication devices during the non-SBFD symbol may be aligned or misaligned.

In some examples of the method, apparatuses, and non-transitory computer-readable medium described herein, a first amount of the first set of resources allocated for performing the CLI measurement during a SBFD symbol may be greater than a second amount of the second set of resources allocated for performing the CLI measurement during a non-SBFD symbol.

Some examples of the method, apparatuses, and non-transitory computer-readable medium described herein may further include operations, features, means, or instructions for distinguishing the first information from the second information based on a periodicity of the first set of resources being associated with a corresponding periodicity of the one or more SBFD symbols.

In some examples of the method, apparatuses, and non-transitory computer-readable medium described herein, the first set of resources and the second set of resources may be indicated per cell of a set of multiple cells.

In some examples of the method, apparatuses, and non-transitory computer-readable medium described herein, the wireless communication device may be a UE and the CLI measurement may be to determine inter-UE CLI.

A method for wireless communication at a wireless communication device is described. The method may include transmitting first information indicative of a first set of resources for performing a CLI measurement during one or more SBFD symbols and transmitting second information indicative of a second set of resources for performing a CLI measurement during one or more non-SBFD symbols.

An apparatus for wireless communication at a wireless communication device is described. The apparatus may include a processor, memory coupled with the processor, and instructions stored in the memory. The instructions may be executable by the processor to cause the apparatus to transmit first information indicative of a first set of resources for performing a CLI measurement during one or more SBFD symbols and transmit second information indicative of a second set of resources for performing a CLI measurement during one or more non-SBFD symbols.

Another apparatus for wireless communication at a wireless communication device is described. The apparatus may include means for transmitting first information indicative of a first set of resources for performing a CLI measurement during one or more SBFD symbols and means for transmitting second information indicative of a second set of resources for performing a CLI measurement during one or more non-SBFD symbols.

A non-transitory computer-readable medium storing code for wireless communication at a wireless communication device is described. The code may include instructions executable by a processor to transmit first information indicative of a first set of resources for performing a CLI measurement during one or more SBFD symbols and transmit second information indicative of a second set of resources for performing a CLI measurement during one or more non-SBFD symbols.

Some examples of the method, apparatuses, and non-transitory computer-readable medium described herein may further include operations, features, means, or instructions for transmitting the first information indicative of a first additional set of resources for reporting a result of the CLI measurement during the one or more SBFD symbols and transmitting the second information indicative of a second additional set of resources for reporting a result of the CLI measurement during the one or more non-SBFD symbols.

In some examples of the method, apparatuses, and non-transitory computer-readable medium described herein, the wireless communication device may be a network entity that supports SBFD operation, and where the first information and the second information may be transmitted to a UE that supports half-duplex operation.

Some examples of the method, apparatuses, and non-transitory computer-readable medium described herein may further include operations, features, means, or instructions for receiving a report indicating a result of the CLI measurement using the first additional set of resources or the second additional set of resources based on a type of symbol in which the CLI measurement may be performed.

In some examples of the method, apparatuses, and non-transitory computer-readable medium described herein, an amount of the second set of resources allocated for performing the CLI measurement during a non-SBFD symbol may be based on whether time division duplex formats applied by the wireless communication device and one or more additional wireless communication devices during the non-SBFD symbol may be aligned or misaligned.

In some examples of the method, apparatuses, and non-transitory computer-readable medium described herein, a first amount of the first set of resources allocated for performing the CLI measurement during a SBFD symbol may be greater than a second amount of the second set of resources allocated for performing the CLI measurement during a non-SBFD symbol.

In some examples of the method, apparatuses, and non-transitory computer-readable medium described herein, the first set of resources and the second set of resources may be indicated per cell of a set of multiple cells.

In some examples of the method, apparatuses, and non-transitory computer-readable medium described herein, the wireless communication device may be a network entity and the CLI measurement may be to determine inter-network entity CLI.

DETAILED DESCRIPTION

Figure 1:
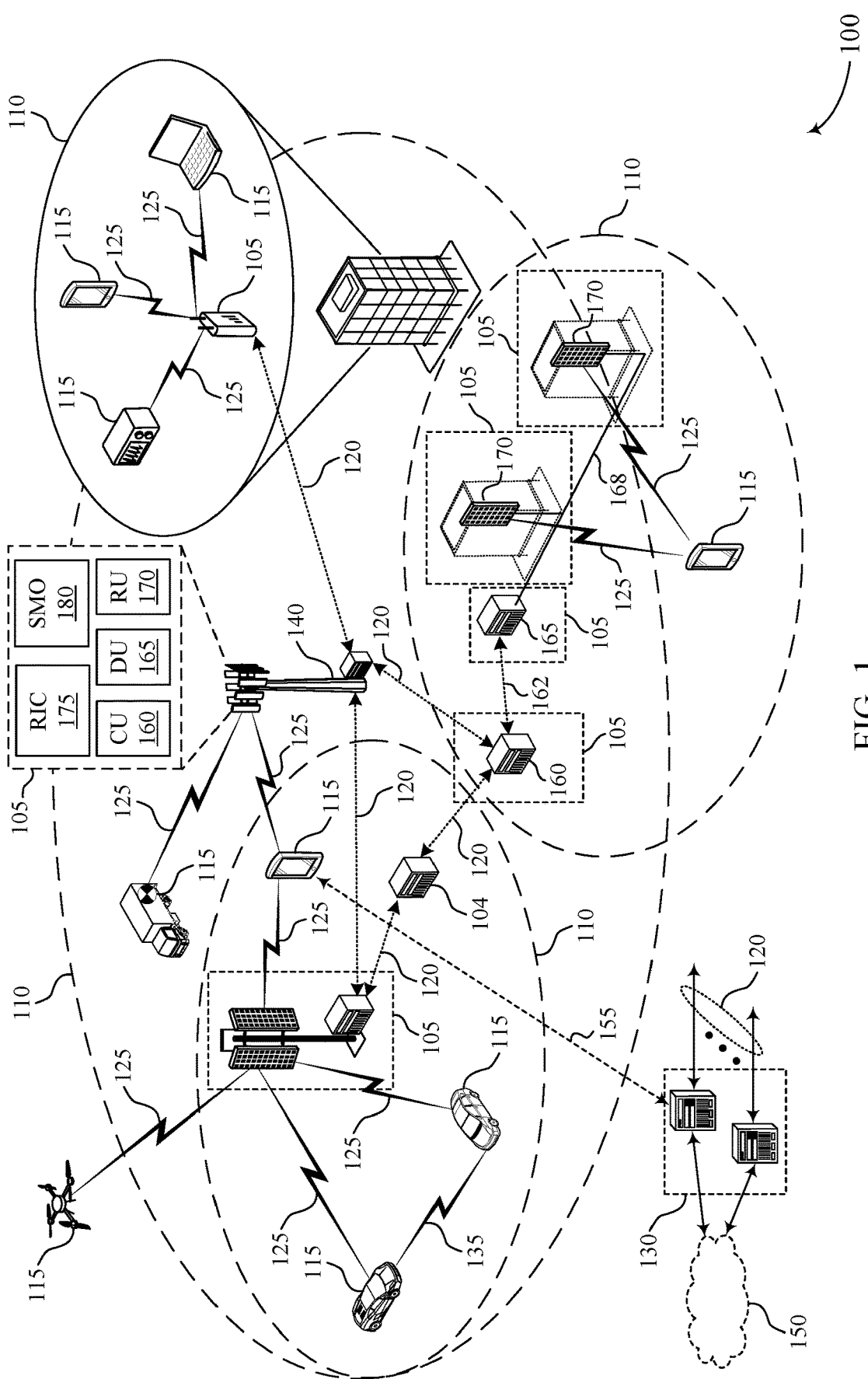
FIG. 1 illustrates an example of a wireless communications system that supports per-resource type cross link interference (CLI) reference signal configurations in accordance with one or more aspects of the present disclosure.

Wireless devices, including user equipments (UEs) and network entities may communicate using half-duplex operation, which may support separate, non-simultaneous transmission or reception of downlink or uplink transmissions. Additionally, or alternatively, UEs and network entities may communicate using full-duplex operation, which may support simultaneous transmission and reception of downlink and uplink transmissions. Subband full-duplex (SBFD) operation, which may be a type of full-duplex operation, may support simultaneous transmission and reception of downlink and uplink transmissions on a subband basis. That is, the wireless devices may communicate uplink and downlink transmissions simultaneously, using different frequency subbands. Some wireless communications systems may only support full-duplex operations by network entities (and not by UEs). Regardless of whether half-duplex operation or full-duplex operation is used, however, the wireless devices (either UEs or network entities) may experience cross link interference (CLI). However, the degree of CLI that may occur during SBFD symbols and during non-SBFD symbols (e.g., during SBFD or non-SBFD operations between the wireless devices) may differ.

The techniques described herein may support separate CLI measurement and reporting procedures based on whether the measured CLI occurs during SBFD symbols or non-SBFD symbols. In some examples, UEs experiencing inter-UE CLI, network entities experiencing inter-gNB CLI, or both may use the different CLI measurement and reporting procedures. In such cases, a wireless device (e.g., a UE, a network entity) may receive signaling indicating sets of resources (e.g., resource configurations) for performing CLI measurements during one or more SBFD symbols or non-SBFD symbols. The sets of resources may differ based on whether the CLI is observed during the SBFD symbols or the non-SBFD symbols. In addition, sets of resources the wireless device may use for reporting CLI measurements may vary. In some examples, the different sets of resources may include more CLI resources for SBFD symbols than for non-SBFD symbols. Additionally, more resources may be allocated for non-SBFD symbols where devices may be subject to misaligned time division duplexing (TDD) cells (e.g., overlapping cells whose TDD formats are not aligned) than for non-SBFD symbols where the devices are subject to aligned TDD cells.

Aspects of the subject matter described herein may be implemented to realize one or more of the following potential improvements, among others. The techniques employed by the described wireless devices (e.g., UEs and network entities) may enable a wireless device to enhance system capacity, improve resource utilization, and improve spectral efficiency, as the wireless device may more efficiently measure and report CLI using the indicated sets of resources. Moreover, the described techniques may enable flexible and dynamic uplink and downlink resource adaptation according to uplink and downlink traffic, which may improve SBFD communications, among other benefits.

Aspects of the disclosure are initially described in the context of wireless communications systems. Aspects of the disclosure are then described in the context of network architectures, CLI configurations, and process flows. Aspects of the disclosure are further illustrated by and described with reference to apparatus diagrams, system diagrams, and flowcharts that relate to per-resource type CLI reference signal configuration.

FIG. 1 illustrates an example of a wireless communications system 100 that supports per-resource type CLI reference signal configurations in accordance with one or more aspects of the present disclosure. The wireless communications system 100 may include one or more network entities 105, one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via one or more communication links 125 (e.g., a radio frequency (RF) access link). For example, a network entity 105 may support a coverage area 110 (e.g., a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be capable of supporting communications with various types of devices, such as other UEs 115 or network entities 105, as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with the core network 130, or with one another, or both. For example, network entities 105 may communicate with the core network 130 via one or more backhaul communication links 120 (e.g., in accordance with an S1, N2, N3, or other interface protocol). In some examples, network entities 105 may communicate with one another via a backhaul communication link 120 (e.g., in accordance with an X2, Xn, or other interface protocol) either directly (e.g., directly between network entities 105) or indirectly (e.g., via a core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 via a communication link 155.

One or more of the network entities 105 described herein may include or may be referred to as a base station 140 (e.g., a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within a single network entity 105 (e.g., a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU) 160, a distributed unit (DU) 165, a radio unit (RU) 170, a RAN Intelligent Controller (RIC) 175 (e.g., a Near-Real Time RIC (Near-RT RIC), a Non-Real Time RIC (Non-RT RIC)), a Service Management and Orchestration (SMO) 180 system, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending on which functions (e.g., network layer functions, protocol layer functions, baseband functions, RF functions, and any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (e.g., F1, F1-c. F1-u), and a DU 165 may be connected to one or more RUs 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities 105 that are in communication via such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some examples, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

For instance, an access network (AN) or RAN may include communications between access nodes (e.g., an IAB donor), IAB nodes 104, and one or more UEs 115. The IAB donor may facilitate connection between the core network 130 and the AN (e.g., via a wired or wireless connection to the core network 130). That is, an IAB donor may refer to a RAN node with a wired or wireless connection to core network 130. The IAB donor may include a CU 160 and at least one DU 165 (e.g., and RU 170), in which case the CU 160 may communicate with the core network 130 via an interface (e.g., a backhaul link). IAB donor and IAB nodes 104 may communicate via an F1 interface according to a protocol that defines signaling messages (e.g., an F1 AP protocol). Additionally, or alternatively, the CU 160 may communicate with the core network via an interface, which may be an example of a portion of backhaul link, and may communicate with other CUs 160 (e.g., a CU 160 associated with an alternative IAB donor) via an Xn-C interface, which may be an example of a portion of a backhaul link.

An IAB node 104 may refer to a RAN node that provides IAB functionality (e.g., access for UEs 115, wireless self-backhauling capabilities). A DU 165 may act as a distributed scheduling node towards child nodes associated with the IAB node 104, and the IAB-MT may act as a scheduled node towards parent nodes associated with the IAB node 104. That is, an IAB donor may be referred to as a parent node in communication with one or more child nodes (e.g., an IAB donor may relay transmissions for UEs through one or more other IAB nodes 104). Additionally, or alternatively, an IAB node 104 may also be referred to as a parent node or a child node to other IAB nodes 104, depending on the relay chain or configuration of the AN. Therefore, the IAB-MT entity of IAB nodes 104 may provide a Uu interface for a child IAB node 104 to receive signaling from a parent IAB node 104, and the DU interface (e.g., DUs 165) may provide a Uu interface for a parent IAB node 104 to signal to a child IAB node 104 or UE 115.

For example, IAB node 104 may be referred to as a parent node that supports communications for a child IAB node, or referred to as a child IAB node associated with an IAB donor, or both. The IAB donor may include a CU 160 with a wired or wireless connection (e.g., a backhaul communication link 120) to the core network 130 and may act as parent node to IAB nodes 104. For example, the DU 165 of IAB donor may relay transmissions to UEs 115 through IAB nodes 104, or may directly signal transmissions to a UE 115, or both. The CU 160 of IAB donor may signal communication link establishment via an F1 interface to IAB nodes 104, and the IAB nodes 104 may schedule transmissions (e.g., transmissions to the UEs 115 relayed from the IAB donor) through the DUs 165. That is, data may be relayed to and from IAB nodes 104 via signaling via an NR Uu interface to MT of the IAB node 104. Communications with IAB node 104 may be scheduled by a DU 165 of IAB donor and communications with IAB node 104 may be scheduled by DU 165 of IAB node 104.

In the case of the techniques described herein applied in the context of a disaggregated RAN architecture, one or more components of the disaggregated RAN architecture may be configured to support per-resource type CLI reference signal configurations as described herein. For example, some operations described as being performed by a UE 115 or a network entity 105 (e.g., a base station 140) may additionally, or alternatively, be performed by one or more components of the disaggregated RAN architecture (e.g., IAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IOT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 (e.g., an access link) using resources associated with one or more carriers. The term "carrier" may refer to a set of RF spectrum resources having a defined physical layer structure for supporting the communication links 125. For example, a carrier used for a communication link 125 may include a portion of a RF spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities 105).

In some examples, such as in a carrier aggregation configuration, a carrier may also have acquisition signaling or control signaling that coordinates operations for other carriers. A carrier may be associated with a frequency channel (e.g., an evolved universal mobile telecommunication system terrestrial radio access (E-UTRA) absolute RF channel number (EARFCN)) and may be identified according to a channel raster for discovery by the UEs 115. A carrier may be operated in a standalone mode, in which case initial acquisition and connection may be conducted by the UEs 115 via the carrier, or the carrier may be operated in a non-standalone mode, in which case a connection is anchored using a different carrier (e.g., of the same or a different radio access technology).

The communication links 125 shown in the wireless communications system 100 may include downlink transmissions (e.g., forward link transmissions) from a network entity 105 to a UE 115, uplink transmissions (e.g., return link transmissions) from a UE 115 to a network entity 105, or both, among other configurations of transmissions. Carriers may carry downlink or uplink communications (e.g., in an FDD mode) or may be configured to carry downlink and uplink communications (e.g., in a TDD mode).

A carrier may be associated with a particular bandwidth of the RF spectrum and, in some examples, the carrier bandwidth may be referred to as a "system bandwidth" of the carrier or the wireless communications system 100. For example, the carrier bandwidth may be one of a set of bandwidths for carriers of a particular radio access technology (e.g., 1.4, 3, 5, 10, 15, 20, 40, or 80 megahertz (MHz)). Devices of the wireless communications system 100 (e.g., the network entities 105, the UEs 115, or both) may have hardware configurations that support communications using a particular carrier bandwidth or may be configurable to support communications using one of a set of carrier bandwidths. In some examples, the wireless communications system 100 may include network entities 105 or UEs 115 that support concurrent communications using carriers associated with multiple carrier bandwidths. In some examples, each served UE 115 may be configured for operating using portions (e.g., a sub-band, a BWP) or all of a carrier bandwidth.

Signal waveforms transmitted via a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both), such that a relatively higher quantity of resource elements (e.g., in a transmission duration) and a relatively higher order of a modulation scheme may correspond to a relatively higher rate of communication. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

The time intervals for the network entities 105 or the UEs 115 may be expressed in multiples of a basic time unit which may, for example, refer to a sampling period of Ts=1/ (Afmax. Nf) seconds, for which Afmax may represent a supported subcarrier spacing, and Nf may represent a supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively-numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots associated with one or more symbols. Excluding the cyclic prefix, each symbol period may be associated with one or more (e.g., Nf) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (STTIs)).

Physical channels may be multiplexed for communication using a carrier according to various techniques. A physical control channel and a physical data channel may be multiplexed for signaling via a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

A network entity 105 may provide communication coverage via one or more cells, for example a macro cell, a small cell, a hot spot, or other types of cells, or any combination thereof. The term "cell" may refer to a logical communication entity used for communication with a network entity 105 (e.g., using a carrier) and may be associated with an identifier for distinguishing neighboring cells (e.g., a physical cell identifier (PCID), a virtual cell identifier (VCID), or others). In some examples, a cell also may refer to a coverage area 110 or a portion of a coverage area 110 (e.g., a sector) over which the logical communication entity operates. Such cells may range from smaller areas (e.g., a structure, a subset of structure) to larger areas depending on various factors such as the capabilities of the network entity 105. For example, a cell may be or include a building, a subset of a building, or exterior spaces between or overlapping with coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered network entity 105 (e.g., a lower-powered base station 140), as compared with a macro cell, and a small cell may operate using the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A network entity 105 may support one or multiple cells and may also support communications via the one or more cells using one or multiple component carriers.

In some examples, a carrier may support multiple cells, and different cells may be configured according to different protocol types (e.g., MTC, narrowband IoT (NB-IOT), enhanced mobile broadband (eMBB)) that may provide access for different types of devices.

In some examples, a network entity 105 (e.g., a base station 140, an RU 170) may be movable and therefore provide communication coverage for a moving coverage area 110. In some examples, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

Some UEs 115 may be configured to employ operating modes that reduce power consumption, such as half-duplex communications (e.g., a mode that supports one-way communication via transmission or reception, but not transmission and reception concurrently). In some examples, half-duplex communications may be performed at a reduced peak rate. Other power conservation techniques for the UEs 115 include entering a power saving deep sleep mode when not engaging in active communications, operating using a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be configured to support communicating directly with other UEs 115 via a device-to-device (D2D) communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by (e.g., scheduled by) the network entity 105. In some examples, one or more UEs 115 of such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to each of the other UEs 115 in the group. In some examples, a network entity 105 may facilitate the scheduling of resources for D2D communications. In some other examples, D2D communications may be carried out between the UEs 115 without an involvement of a network entity 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. UHF waves may be blocked or redirected by buildings and environmental features, which may be referred to as clusters, but the waves may penetrate structures sufficiently for a macro cell to provide service to the UEs 115 located indoors. Communications using UHF waves may be associated with smaller antennas and shorter ranges (e.g., less than 100 kilometers) compared to communications using the smaller frequencies and longer waves of the high frequency (HF) or very high frequency (VHF) portion of the spectrum below 300 MHz.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology using an unlicensed band such as the 5 GHz industrial, scientific, and medical (ISM) band. While operating using unlicensed RF spectrum bands, devices such as the network entities 105 and the UEs 115 may employ carrier sensing for collision detection and avoidance. In some examples, operations using unlicensed bands may be based on a carrier aggregation configuration in conjunction with component carriers operating using a licensed band (e.g., LAA). Operations using unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located at diverse geographic locations. A network entity 105 may include an antenna array with a set of rows and columns of antenna ports that the network entity 105 may use to support beamforming of communications with a UE 115. Likewise, a UE 115 may include one or more antenna arrays that may support various MIMO or beamforming operations. Additionally, or alternatively, an antenna panel may support RF beamforming for a signal transmitted via an antenna port.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating along particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

Some UEs 115 and network entities 105 may support SBFD operation, where the wireless devices may perform simultaneous transmission and reception of downlink and uplink transmissions on a subband basis. That is, the wireless devices may communicate uplink and downlink transmissions simultaneously, using different frequency subbands. In some cases, the UEs 115 and the network entities 105 may experience CLI, such as inter-UE CLI or inter-gNB CLI, which may occur when two respective wireless devices are simultaneously transmitting and receiving in a same frequency band. As such, the wireless devices may experience different degrees of CLI during SBFD resources and non-SBFD resources if communicating using SBFD operation.

The wireless communications system 100 may support separate CLI measurement and reporting procedures based on whether the measured CLI occurs during SBFD symbols or non-SBFD symbols. In some examples, a wireless device (e.g., a UE 115 experiencing inter-UE CLI or a network entity 105 experiencing inter-gNB CLI) may receive information indicative of multiple sets of resources for performing a CLI measurement during one or more SBFD symbols or one or more non-SBFD symbols. In some examples, the sets of resources may vary in terms of how many CLI resources a wireless device may use for performing the CLI measurements. The wireless device may perform a CLI measurement using a set of resources based on a type of symbol (e.g., SBFD or non-SBFD) in which the CLI measurement is performed. In some examples, the wireless device may transmit a report indicating a result of the CLI measurement using an additional set of resources also based on whether the CLI measurement is performed in SBFD or non-SBFD symbols.

Figure 2:
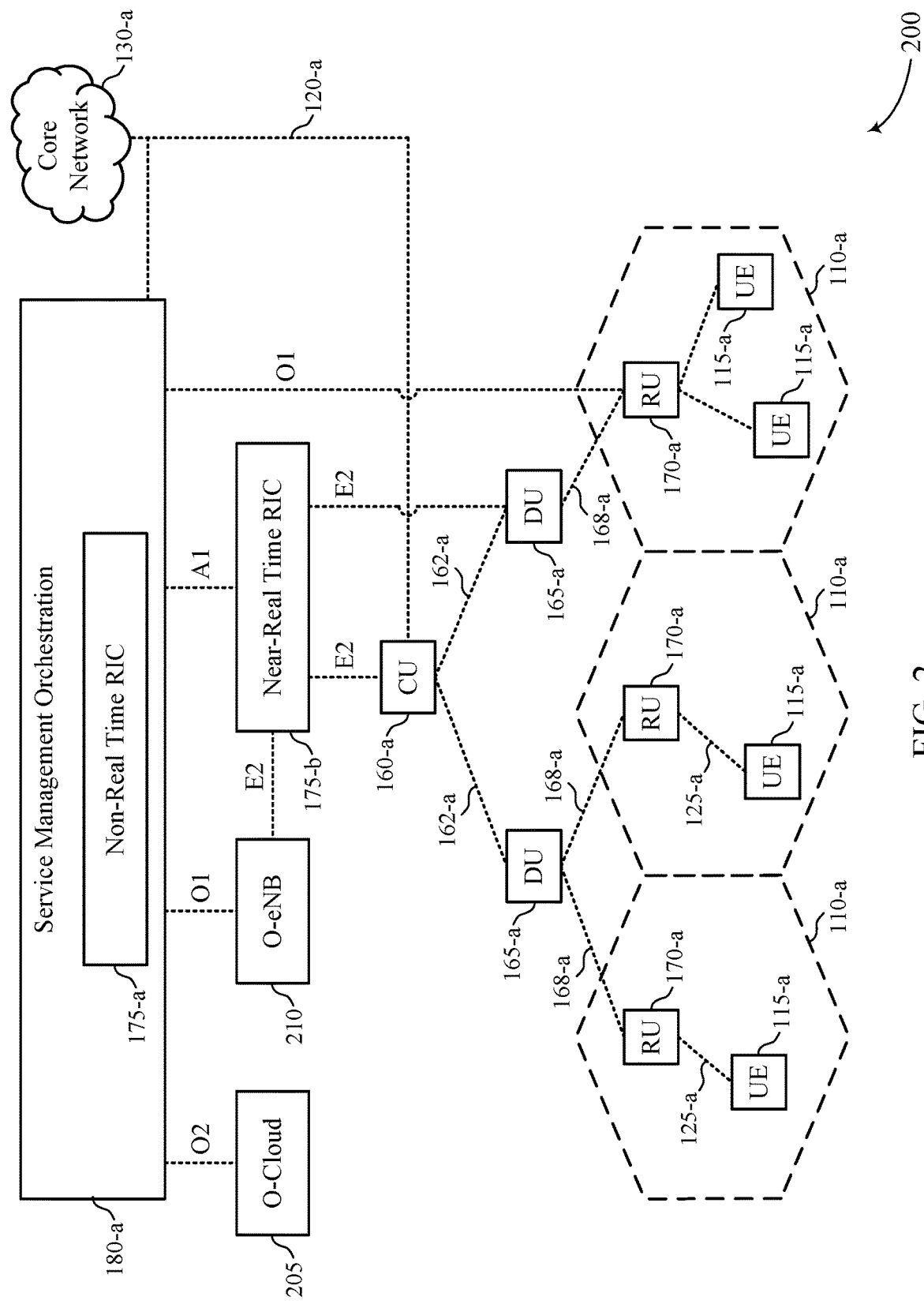
FIG. 2 illustrates an example of a network architecture that supports per-resource type CLI reference signal configurations in accordance with one or more aspects of the present disclosure.

FIG. 2 illustrates an example of a network architecture 200 (e.g., a disaggregated base station architecture, a disaggregated RAN architecture) that supports per-resource type CLI reference signal configurations in accordance with one or more aspects of the present disclosure. The network architecture 200 may illustrate an example for implementing one or more aspects of the wireless communications system 100. The network architecture 200 may include one or more CUs 160-a that may communicate directly with a core network 130-a via a backhaul communication link 120-a, or indirectly with the core network 130-a through one or more disaggregated network entities 105 (e.g., a Near-RT RIC 175-b via an E2 link, or a Non-RT RIC 175-a associated with an SMO 180-a (e.g., an SMO Framework), or both). A CU 160-a may communicate with one or more DUs 165-a via respective midhaul communication links 162-a (e.g., an F1 interface). The DUs 165-a may communicate with one or more RUs 170-a via respective fronthaul communication links 168-a. The RUs 170-a may be associated with respective coverage areas 110-a and may communicate with UEs 115-a via one or more communication links 125-a. In some implementations, a UE 115-a may be simultaneously served by multiple RUs 170-a.

Each of the network entities 105 of the network architecture 200 (e.g., CUs 160-a, DUs 165-a. RUs 170-a, Non-RT RICs 175-a, Near-RT RICs 175-b, SMOs 180-a, Open Clouds (O-Clouds) 205, Open eNBs (O-eNBs) 210) may include one or more interfaces or may be coupled with one or more interfaces configured to receive or transmit signals (e.g., data, information) via a wired or wireless transmission medium. Each network entity 105, or an associated processor (e.g., controller) providing instructions to an interface of the network entity 105, may be configured to communicate with one or more of the other network entities 105 via the transmission medium. For example, the network entities 105 may include a wired interface configured to receive or transmit signals over a wired transmission medium to one or more of the other network entities 105. Additionally, or alternatively, the network entities 105 may include a wireless interface, which may include a receiver, a transmitter, or transceiver (e.g., an RF transceiver) configured to receive or transmit signals, or both, over a wireless transmission medium to one or more of the other network entities 105.

In some examples, a CU 160-a may host one or more higher layer control functions. Such control functions may include RRC, PDCP, SDAP, or the like. Each control function may be implemented with an interface configured to communicate signals with other control functions hosted by the CU 160-a. A CU 160-a may be configured to handle user plane functionality (e.g., CU-UP), control plane functionality (e.g., CU-CP), or a combination thereof. In some examples, a CU 160-a may be logically split into one or more CU-UP units and one or more CU-CP units. A CU-UP unit may communicate bidirectionally with the CU-CP unit via an interface, such as an E1 interface when implemented in an O-RAN configuration. A CU 160-a may be implemented to communicate with a DU 165-a, as necessary, for network control and signaling.

A DU 165-a may correspond to a logical unit that includes one or more functions (e.g., base station functions, RAN functions) to control the operation of one or more RUs 170-a. In some examples, a DU 165-a may host, at least partially, one or more of an RLC layer, a MAC layer, and one or more aspects of a PHY layer (e.g., a high PHY layer, such as modules for FEC encoding and decoding, scrambling, modulation and demodulation, or the like) depending, at least in part, on a functional split, such as those defined by the 3rd Generation Partnership Project (3GPP). In some examples, a DU 165-a may further host one or more low PHY layers. Each layer may be implemented with an interface configured to communicate signals with other layers hosted by the DU 165-a, or with control functions hosted by a CU 160-a.

In some examples, lower-layer functionality may be implemented by one or more RUs 170-a. For example, an RU 170-a, controlled by a DU 165-a, may correspond to a logical node that hosts RF processing functions, or low-PHY layer functions (e.g., performing fast Fourier transform (FFT), inverse FFT (iFFT), digital beamforming, physical random access channel (PRACH) extraction and filtering, or the like), or both, based at least in part on the functional split, such as a lower-layer functional split. In such an architecture, an RU 170-a may be implemented to handle over the air (OTA) communication with one or more UEs 115-a. In some implementations, real-time and non-real-time aspects of control and user plane communication with the RU(s) 170-a may be controlled by the corresponding DU 165-a. In some examples, such a configuration may enable a DU 165-a and a CU 160-a to be implemented in a cloud-based RAN architecture, such as a vRAN architecture.

The SMO 180-a may be configured to support RAN deployment and provisioning of non-virtualized and virtualized network entities 105. For non-virtualized network entities 105, the SMO 180-a may be configured to support the deployment of dedicated physical resources for RAN coverage requirements which may be managed via an operations and maintenance interface (e.g., an O1 interface). For virtualized network entities 105, the SMO 180-a may be configured to interact with a cloud computing platform (e.g., an O-Cloud 205) to perform network entity life cycle management (e.g., to instantiate virtualized network entities 105) via a cloud computing platform interface (e.g., an O2 interface). Such virtualized network entities 105 can include, but are not limited to, CUs 160-a, DUs 165-a. RUs 170-a, and Near-RT RICs 175-b. In some implementations, the SMO 180-a may communicate with components configured in accordance with a 4G RAN (e.g., via an O1 interface). Additionally, or alternatively, in some implementations, the SMO 180-a may communicate directly with one or more RUs 170-a via an O1 interface. The SMO 180-a also may include a Non-RT RIC 175-a configured to support functionality of the SMO 180-a.

The Non-RT RIC 175-a may be configured to include a logical function that enables non-real-time control and optimization of RAN elements and resources, Artificial Intelligence (AI) or Machine Learning (ML) workflows including model training and updates, or policy-based guidance of applications/features in the Near-RT RIC 175-b. The Non-RT RIC 175-a may be coupled to or communicate with (e.g., via an AI interface) the Near-RT RIC 175-b. The Near-RT RIC 175-b may be configured to include a logical function that enables near-real-time control and optimization of RAN elements and resources via data collection and actions over an interface (e.g., via an E2 interface) connecting one or more CUs 160-a, one or more DUs 165-a, or both, as well as an O-eNB 210, with the Near-RT RIC 175-b.

In some examples, to generate AI/ML models to be deployed in the Near-RT RIC 175-b, the Non-RT RIC 175-a may receive parameters or external enrichment information from external servers. Such information may be utilized by the Near-RT RIC 175-*b* and may be received at the SMO 180-*a* or the Non-RT RIC 175-*a* from non-network data sources or from network functions. In some examples, the Non-RT RIC 175-*a* or the Near-RT RIC 175-*b* may be configured to tune RAN behavior or performance. For example, the Non-RT RIC 175-*a* may monitor long-term trends and patterns for performance and employ AI or ML models to perform corrective actions through the SMO 180-*a* (e.g., reconfiguration via O1) or via generation of RAN management policies (e.g., AI policies).

The network architecture 200 may support separate CLI measurement and reporting procedures based on whether a UE 115-*a* measures CLI during SBFD symbols or non-SBFD symbols. In some examples, a wireless device may receive information indicative of multiple sets of resources for performing a CLI measurement during one or more SBFD symbols or one or more non-SBFD symbols. The wireless device may include a UE 115-*a* experiencing inter-UE CLI or a network entity 105 experiencing inter-gNB CLI, where the network entity 105 may include one or more of a CU 160-*a*, a DU 165-*a*, or an RU 170-*a*. In some examples, the sets of resources may vary in terms of how many CLI resources a wireless device may use for performing the CLI measurements. The wireless device may perform a CLI measurement using a set of resources based on a type of symbol (e.g., SBFD or non-SBFD) in which the CLI measurement is performed. In some examples, the wireless device may transmit a report indicating a result of the CLI measurement using an additional set of resources also based on whether the CLI measurement is performed in SBFD or non-SBFD symbols.

Figure 3:
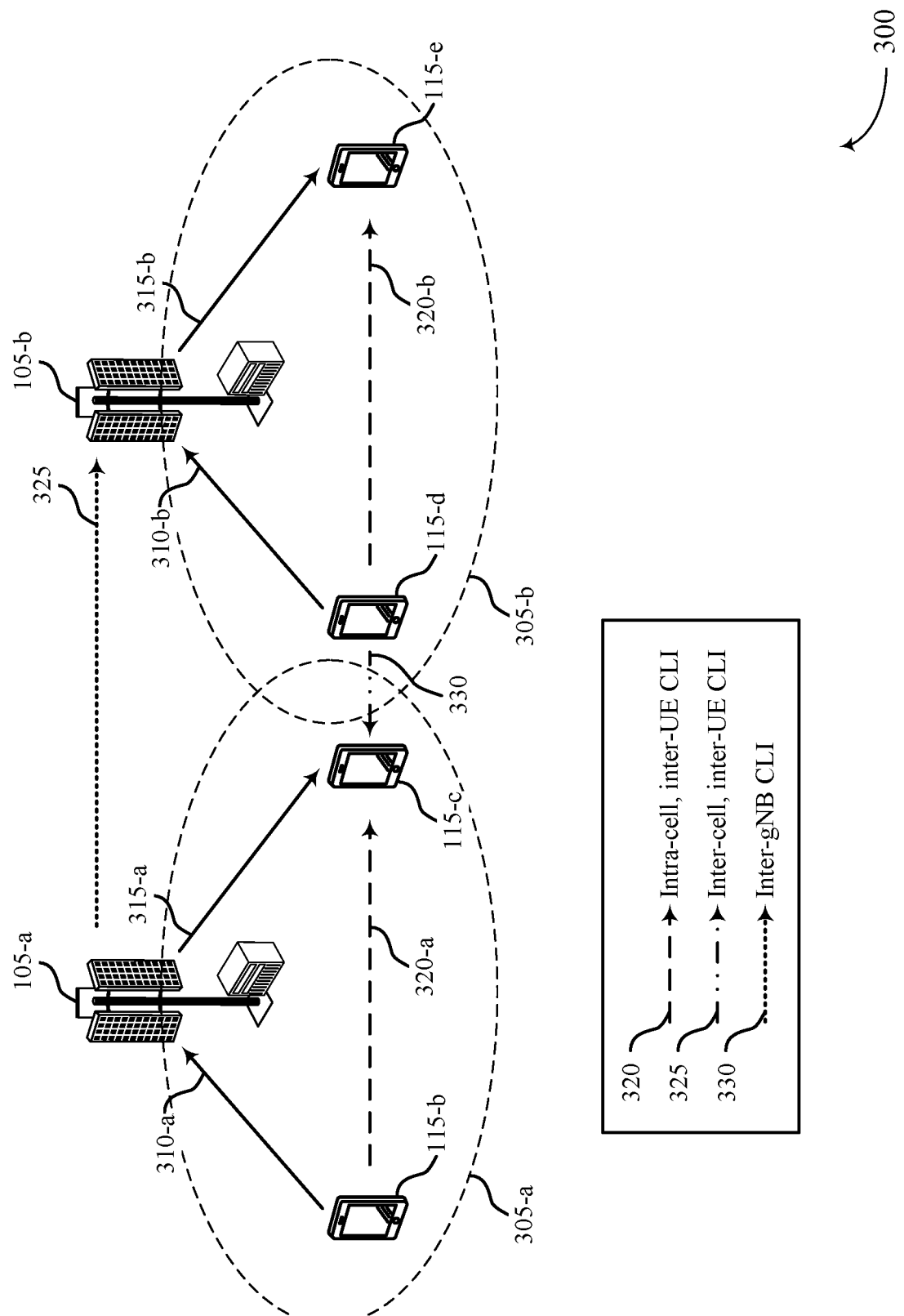
FIG. 3 illustrates an example of a wireless communications system that supports per-resource type CLI reference signal configurations in accordance with one or more aspects of the present disclosure.

FIG. 3 illustrates an example of a wireless communications system 300 that supports per-resource type CLI reference signal configurations in accordance with one or more aspects of the present disclosure. In some examples, the wireless communications system 300 may implement aspects of the wireless communications system 100 or may be implemented by aspects of the wireless communications system 100. For example, the wireless communications system 300 may include a cell 305-*a* supported by a network entity 105-*a* and a cell 305-*b* supported by a network entity 105-*b*. In some examples, the network entities 105 may correspond to gNBs or core networks, or may include one or more of a CU 160, a DU 165, and an RU 170, as described herein. In some cases, the network entity 105-*a* may communicate with a UE 115-*b* and a UE 115-*c* within the cell 305-*a*, and the network entity 105-*b* may communicate with a UE 115-*d* and a UE 115-*e* within the cell 305-*b*. The UEs 115 may be examples of wireless communication devices that support CLI measurement and reporting configurations for SBFD or non-SBFD symbols.

The wireless communications system 300 may support communications between the UEs 115 and the network entities 105. For example, the UE 115-*b* may transmit uplink communications 310-*a* to the network entity 105-*a*, and the network entity 105-*a* may transmit downlink communications 315-*a* to the UE 115-*c*. Additionally, the UE 115-*d* may transmit uplink communications 310-*b* to the network entity 105-*b*, and the network entity 105-*b* may transmit downlink communications 315-*b* to the UE 115-*c*. The UEs 115 and the network entities 105 may support half-duplex operation or a type of full-duplex operation such as SBFD operation. For example, if operating using SBFD, the wireless communication devices may perform simultaneous transmission and reception of downlink and uplink transmissions on a subband basis. That is, the wireless communication devices may communicate uplink and downlink transmissions (e.g., the uplink communications 310 and the downlink communications 315) simultaneously, using different frequency subbands.

In some examples, in part based on operating using SBFD operation, the UEs 115, the network entities 105, and other wireless communication devices in the wireless communications system 300 may experience CLI. For example, the UE 115-*b* and the UE 115-*c* may experience CLI 320-*a* and the UE 115-*d* and the UE 115-*e* may experience CLI 320-*b*, where the CLI 320-*a* and the CLI 320-*b* may be inter-subband, intra-cell CLI (e.g., a type of inter-UE CLI). Additionally, the UE 115-*c* and the UE 115-*d* may experience CLI 330, which may be inter-subband, inter-cell CLI (e.g., a type of inter-UE CLI). The CLI 330 may originate from the UE 115-*c* or the UE 115-*d*. In some cases, the network entities 105 may experience CLI 325 which may be inter-subband, inter-gNB CLI. In some examples, if the UEs 115 and the network entities 105 support fully-overlapped full-duplex operation, the CLI between the wireless communication devices may include in-band CLI based on each of the wireless communication devices using a same frequency band.

The wireless communication devices may use the techniques described herein to mitigate inter-UE CLI inter-gNB CLI, particularly in SBFD scenarios (partially or fully-overlapping). Specifically, the network entities 105 may indicate different resource configurations for measuring and reporting CLI by the UEs 115, which may enable the wireless communication devices to enhance system capacity, improve resource utilization, and improve spectral efficiency.

A UE 115 (e.g., the UE 115-*c*) may receive information indicating respective sets of resources for performing CLI measurements during SBFD or non-SBFD symbols. For example, the UE 115-*c* may receive first information indicative of a first set of resources for performing a CLI measurement during one or more SBFD resources (e.g., SBFD symbols) and second information indicative of a second set of resources for performing a CLI measurement during one or more non-SBFD resources (e.g., half-duplex symbols). That is, as a UE 115 or a network entity 105 may support different resource types as described herein with reference to FIG. 4, the wireless communication devices may use different CLI mitigation techniques configured for each resource type. In some examples, the first information and the second information may be included in same signaling (e.g., lower-layer signaling) or different signaling, and may be transmitted separately for inter-UE CLI and inter-gNB CLI measurements.

In some cases, the UE 115 may distinguish the first information from the second information based on a periodicity of the first set of resources being associated with a corresponding periodicity of the one or more SBFD symbols. For example, if the first set of resources includes half-duplex symbols or other symbols in addition to the SBFD symbols, the UE 115 may exclude symbols other than the one or more SBFD symbols from the periodicity, thus distinguishing between the resource configurations for SBFD and non-SBFD symbols.

In addition to the resources for performing the CLI measurement, the UE 115 may receive information indicating respective sets of additional resources for reporting a result of the CLI measurement. For example, the UE 115 may receive the first information indicative of a first additional set of resources for reporting a result of the CLI measurement during the one or more SBFD symbols and the second information indicative of a second additional set of resources for reporting a result of the CLI measurement during the one or more non-SBFD symbols.

The UE 115 may perform the CLI measurement using the first or second set of resources based on which type of symbol in which the UE 115 performs the CLI measurement. For example, the UE 115 may use the first set of resources if the UE 115 performs the CLI measurement in the one or more SBFD symbols or the second set of resources if the UE 115 performs the CLI measurement in the one or more non-SBFD symbols. In some cases, performing the CLI measurement may include performing a received signal strength indicator (RSSI) measurement, a signal interference-to-noise ratio (SINR) measurement, a reference signal received power (RSRP) measurement, or a combination thereof.

In some cases, in non-SBFS symbols, there may be a lack of CLI impact if there is an aligned TDD format (e.g., slot format) across the cells 305. Alternatively, misaligned TDD formats across the cells 305 (e.g., a dynamic TDD scenario) may result in the CLI 325 (e.g., inter-cell, inter-UE CLI). Accordingly, the UE 115 may perform a CLI measurement during a non-SBFD symbol based on a misalignment of TDD formats applied by the UE 115 and one or more additional wireless communication devices (e.g., a UE 115, a network entity 105) during the non-SBFD symbol. In such cases, CLI levels may be different and lower for non-SBFD symbols than for SBFD symbols. In this way, an amount (e.g., quantity) of the second set of resources allocated for performing the CLI measurement during a non-SBFD symbol may be based on whether TDD formats applied by the UE 115 and the one or more additional wireless communication devices during the non-SBFD symbol are aligned or misaligned.

In some examples, a wireless communication device may allocate no CLI reference signal resources if the applied TDD formats are aligned. Alternatively, the wireless communication device may allocate fewer CLI reference signal resources for misaligned TDD formats, for example, in cases where UEs 115 may be clustered relatively closely together. That is, inter-cell, inter-UE CLI (e.g., the CLI 325) may have a lesser impact on misaligned non-SBFD symbols than intra-cell, inter-UE CLI (e.g., the CLI 320) for SBFD symbols, as the inter-UE distance may be smaller for SBFD symbols within a cell 305. As such, a first amount (e.g., quantity) of the first set of resources allocated for performing the CLI measurement during an SBFD symbol may be greater than a second amount (e.g., quantity) of the second set of resources allocated for performing the CLI measurement during a non-SBFD symbol.

In some examples, a wireless communication device (e.g., a gNB or a network entity 105 for intra-cell CLI, or a CU 160 or OAM for inter-cell CLI across cells) may configure separate inter-UE CLI reference signal measurement resources and reporting resources across the SBFD symbols and the non-SBFD symbols per cell 305. That is, the first set of resources and the second set of resources may be indicated per cell 305.

After performing the CLI measurement in the one or more SBFD symbols or the one or more non-SBFD symbols, the UE 115 may transmit a report indicating a result of the CLI measurement using the respective resources. For example, the UE 115 may transmit a report indicating a result of the CLI measurement using the first additional set of resources based on the CLI measurement being performed in an SBFD symbol, or the second additional set of resources based on the CLI measurement being performed in a non-SBFD symbol.

Figure 4:
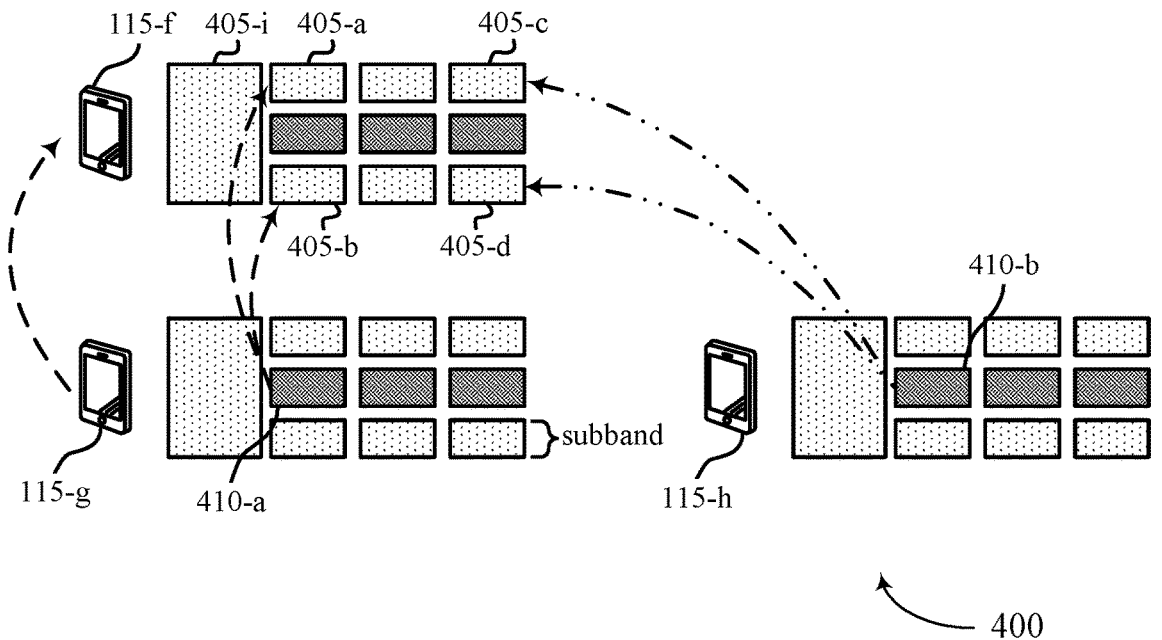
FIG. 4 illustrates an example of CLI that supports per-resource type CLI reference signal configurations in accordance with one or more aspects of the present disclosure.
Figure 4:
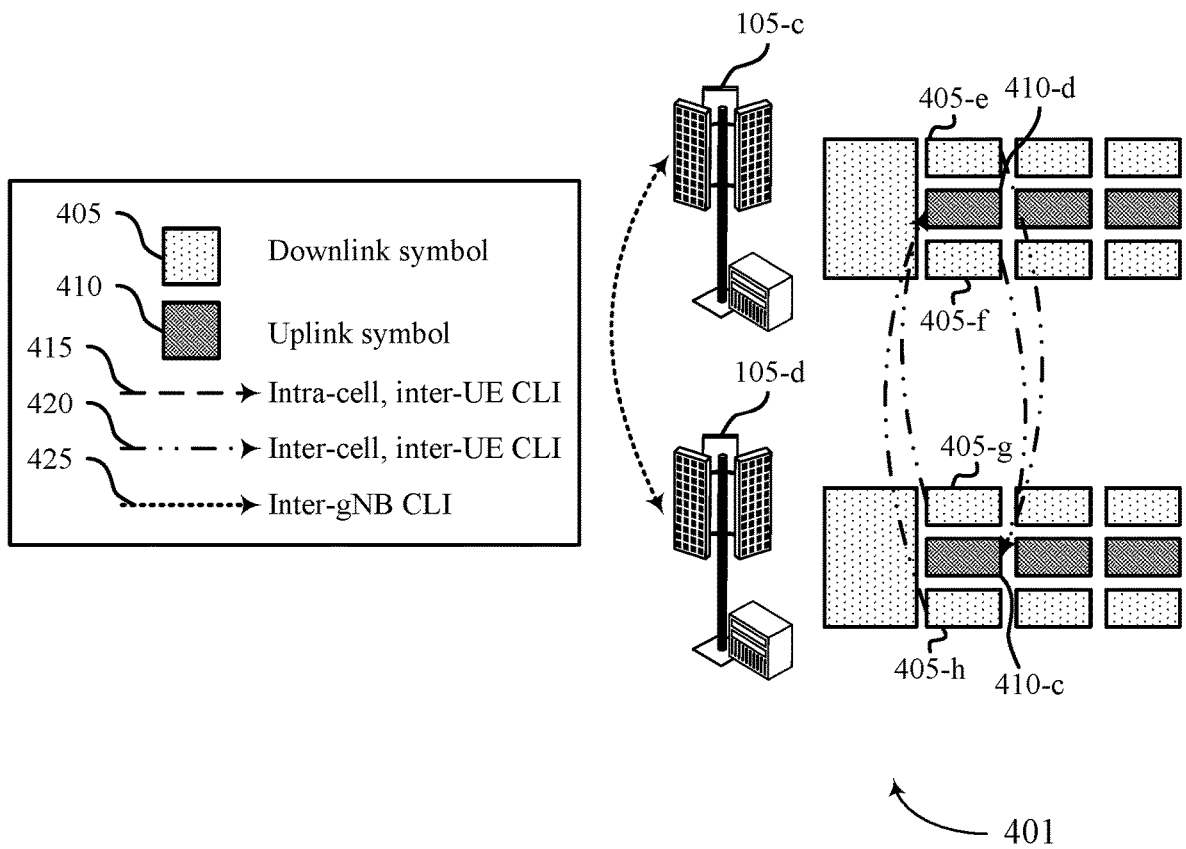

FIG. 4 illustrates an example of CLI 400 and CLI 401 that support per-resource type CLI reference signal configurations in accordance with one or more aspects of the present disclosure. In some examples, the CLI 400 may occur between a UE 115-*f*, a UE 115-*g*, and a UE 115-*h*, where the UEs 115 may be examples of wireless communication devices that support SBFD operation. The CLI 401 may occur between a network entity 105-*c* and the network entity 105-*d*, where the network entities 105 may be examples of gNBs or core networks that support SBFD operation, and may include one or more of a CU 160, a DU 165, or an RU 170 as described herein.

The UEs 115 may each support some downlink symbols 405 and some uplink symbols 410 across one or more frequency subbands for the SBFD operation. The downlink symbols 405 and the uplink symbols 410 may be a combination of half-duplex symbols (which may span a full band, such as a downlink symbol 405-*i*) and SBFD symbols (which may span a subband, such as a downlink symbol 405-*a*). In some examples, the CLI 400 may include intra-cell, inter-UE CLI 415 between the UE 115-*f* and the UE 115-*g*, which may be an example of the CLI 320 described herein with reference to FIG. 3. That is, the UE 115-*f* and the UE 115-*g* may operate in a same cell. The intra-cell, inter-UE CLI 415 may originate from an uplink subband associated with the UE 115-*g*, including an uplink symbol 410-*a*, and may impact downlink subbands associated with the UE 115-*f* including the downlink symbol 405-*a* and a downlink symbol 405-*b*.

In some examples, for inter-UE CLI measurements during the one or more SBFD symbols, a wireless communication device (e.g., a network entity) may configure an inter-UE CLI reference signal to be measured in one or more downlink subbands for inter-subband leakage, and in one or more uplink subbands for intra-subband CLI that may impact a dynamic receiving range, receive AGC blocking, or both. For example, the UE 115-*f* may perform at least one of an RSSI measurement or an SINR measurement for the one or more downlink subbands in an SBFD symbol, including the downlink symbol 405-*a* and the downlink symbol 405-*b*. In doing so, the UE 115 may measure CLI arising from inter-subband leakage due to an uplink transmission from a neighboring wireless communication device (e.g., the UE 115-*g*) during the SBFD symbol (e.g., the uplink symbol 410-*a*). Additionally, or alternatively, the UE 115-*f* may perform at least one of an RSSI measurement or an RSRP measurement for the one or more uplink subbands in the SBFD symbol to measure intra-subband CLI arising from the uplink transmission.

Additionally, or alternatively, the CLI 400 may include inter-cell, inter-UE CLI 420 between the UE 115-*f* and the UE 115-*h*, which may be an example of the CLI 325 described herein with reference to FIG. 3. That is, the UE 115-*f* and the UE 115-*h* may operate in different cells. The inter-cell, inter-UE CLI 420 may originate from a downlink subband associated with the UE 115-*h*, including an uplink symbol 410-*b*, and may impact the downlink subbands associated with the UE 115-*f*, including a downlink symbol 405-*c* and a downlink symbol 405-*d*.

In some examples, the CLI 401 may include inter-gNB CLI 425 (e.g., inter-subband, inter-gNB CLI), which may be an example of the CLI 330 described herein with reference to FIG. 3. The inter-gNB CLI 425 may originate from and impact both network entities 105. For example, the intergNB CLI 425 may originate from downlink subbands associated with the network entity 105-*c*, including a downlink symbol 405-*c* and a downlink symbol 405-*f*, and may impact an uplink subband associated with the network entity 105-*d*, which may include an uplink symbol 410-*c*. Additionally, or alternatively, the inter-gNB CLI 425 may originate from downlink subbands associated with the network entity 105-*d*, including a downlink symbol 405-*g* and a downlink symbol 405-*h*, and may impact an uplink subband associated with the network entity 105-*c*, including an uplink symbol 410-*d*.

As described herein, for inter-gNB CLI measurements during the one or more SBFD symbols, a wireless communication device (e.g., a network entity 105) may configure an inter-gNB CLI reference signal to be measured in one or more uplink subbands for inter-subband leakage, and in one or more downlink subbands for intra-subband CLI that may impact a dynamic receiving range, receive AGC blocking, or both. For example, the network entity 105-*d* may perform at least one of an RSSI measurement or an SINR measurement for the one or more uplink subbands in an SBFD symbol, including the uplink symbol 410-*c*. In doing so, the network entity 105-*d* may measure CLI arising from inter-subband leakage due to a downlink transmission from a neighboring wireless communication device (e.g., the network entity 105-*c*) during the SBFD symbol (e.g., the uplink symbol 410-*d*). Additionally, or alternatively, the network entity 105-*c* may perform at least one of an RSSI measurement or an RSRP measurement for the one or more uplink subbands in the SBFD symbol to measure intra-subband CLI arising from the uplink transmission.

Figure 5:
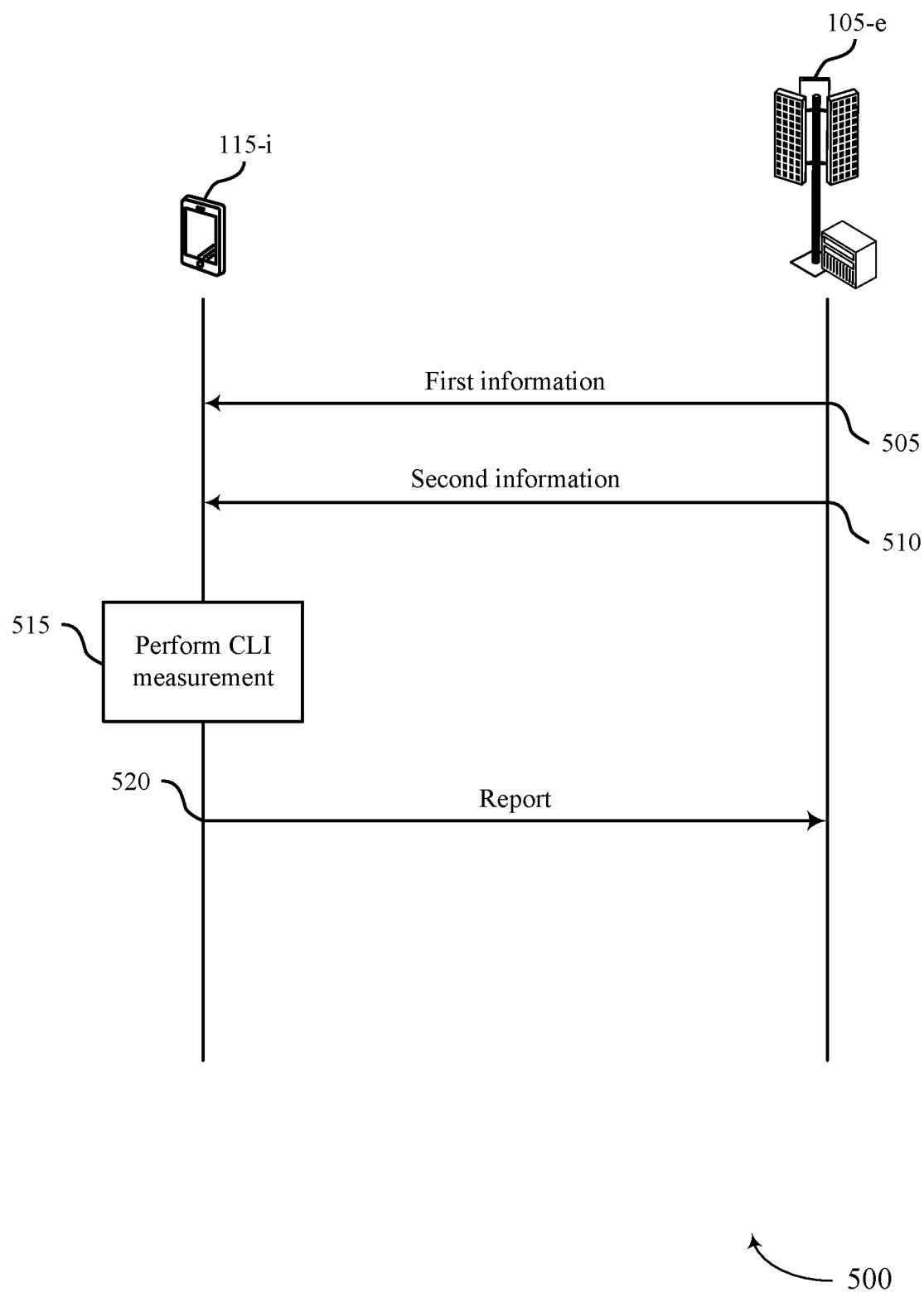
FIG. 5 illustrates an example of a process flow that supports per-resource type CLI reference signal configurations in accordance with one or more aspects of the present disclosure.

FIG. 5 illustrates an example of a process flow 500 that supports per-resource type CLI reference signal configurations in accordance with one or more aspects of the present disclosure. The process flow 500 may implement aspects of wireless communications systems 100, or may be implemented by aspects of the wireless communications system 100. For example, the process flow 500 may illustrate operations between a UE 115-*i* and a network entity 105-*e*, which may be examples of corresponding devices described herein. In the following description of the process flow 500, the operations between the UE 115-*i* and the network entity 105-*e* may be transmitted in a different order than the example order shown, or the operations performed by the UE 115-*i* and the network entity 105-*e* may be performed in different orders or at different times. Some operations may also be omitted from the process flow 500, and other operations may be added to the process flow 500.

At 505, the UE 115-*i* (e.g., a wireless communication device) may receive first information indicative of a first set of resources for performing a CLI measurement during one or more SBFD symbols. The UE 115-*i* and additional wireless communication devices in communication with the UE 115-*i* may support SBFD operation. In some cases, the first information may indicate a first set of additional resources for reporting a result of the CLI measurement during the one or more SBFD symbols.

At 510, the UE 115-*i* may receive second information indicative of a second set of resources for performing a CLI measurement during one or more non-SBFD symbols. In some cases, the second information may indicate a second set of additional resources for reporting a result of the CLI measurement during the one or more non-SBFD symbols.

At 515, the UE 115-*i* may perform the CLI measurement using the first set of resources or the second set of resources based on a type of symbol in which the CLI measurement is performed, where the type of symbol is an SBFD symbol or a non-SBFD symbol. For example, the UE 115-*i* may use the first set of resources if the CLI measurement is performed in an SBFD symbol or the second set of resources if the CLI measurement is performed in a non-SBFD symbol. In some examples, the CLI measurement may include an RSSI measurement, a SINR measurement, an RSRP measurement, or a combination thereof.

At 520, the UE 115-*i* may transmit a report indicating a result of the CLI measurement using the first additional set of resources or the second additional set of resources based on the type of symbol in which the CLI measurement is performed. For example, the UE 115-*i* may use the first set of additional resources if the CLI measurement is performed in an SBFD symbol or the second set of additional resources if the CLI measurement is performed in a non-SBFD symbol.

Figure 6:
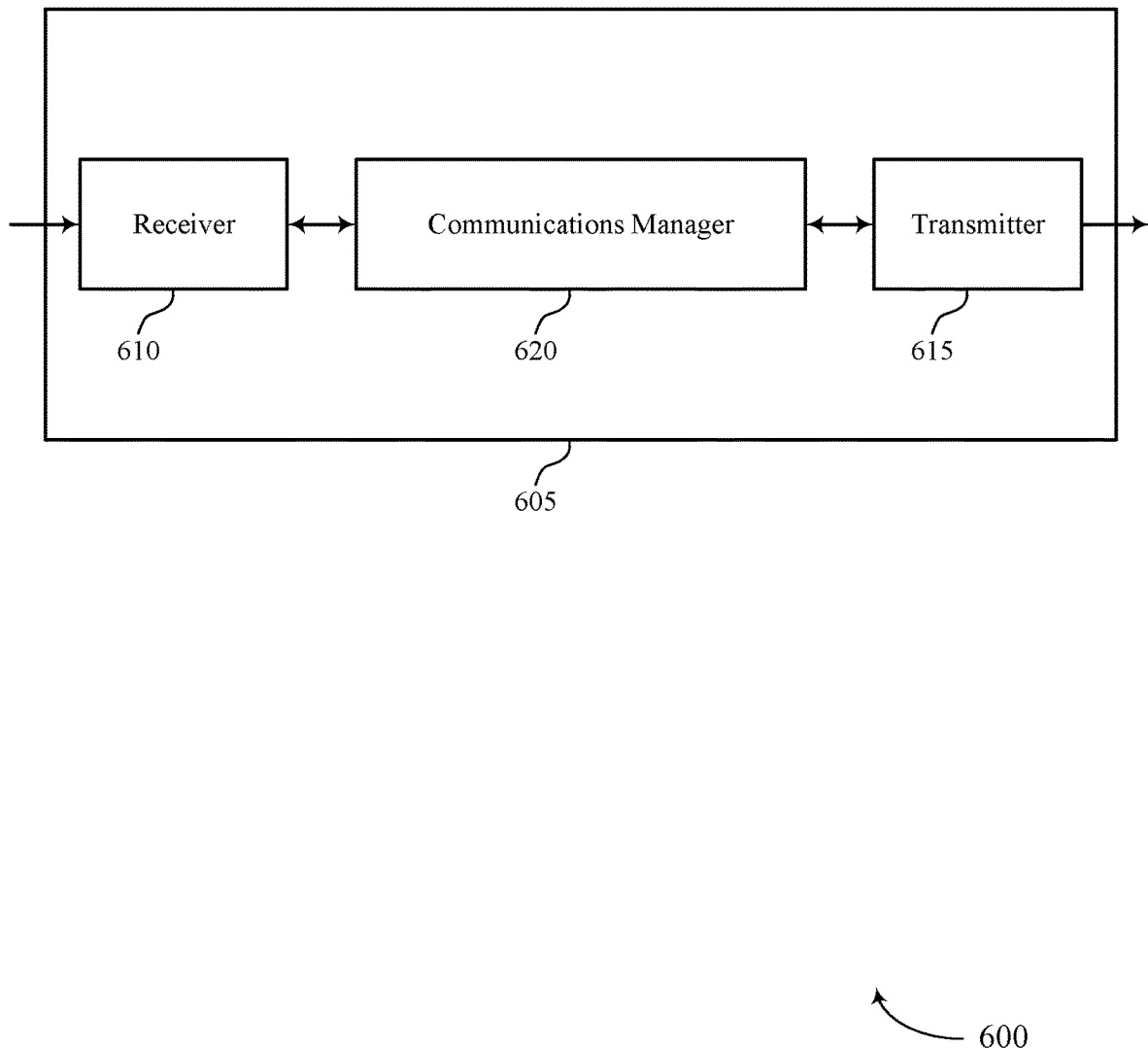
FIGS. 6 and 7 illustrate block diagrams of devices that support per-resource type CLI reference signal configurations in accordance with one or more aspects of the present disclosure.

FIG. 6 illustrates a block diagram 600 of a device 605 that supports per-resource type CLI reference signal configurations in accordance with one or more aspects of the present disclosure. The device 605 may be an example of aspects of a wireless communication device as described herein. The device 605 may include an receiver 610, an transmitter 615, and a communications manager 620. The device 605 may also include a processor. Each of these components may be in communication with one another (e.g., via one or more buses).

The receiver 610 may manage input signals for the device 605. For example, the receiver 610 may identify input signals based on an interaction with a modem, a keyboard, a mouse, a touchscreen, or a similar device. These input signals may be associated with user input or processing at other components or devices. In some cases, the receiver 610 may utilize an operating system such as iOS®, ANDROID®, MS-DOS®, MS-WINDOWS®, OS/2®, UNIX®, LINUX®, or another known operating system to handle input signals. The receiver 610 may send aspects of these input signals to other components of the device 605 for processing. For example, the receiver 610 may transmit input signals to the communications manager 620 to support per-resource type CLI reference signal configuration. In some cases, the receiver 610 may be a component of an I/O controller 910 as described with reference to FIG. 9.

The transmitter 615 may manage output signals for the device 605. For example, the transmitter 615 may receive signals from other components of the device 605, such as the communications manager 620, and may transmit these signals to other components or devices. In some specific examples, the transmitter 615 may transmit output signals for display in a user interface, for storage in a database or data store, for further processing at a server or server cluster, or for any other processes at any number of devices or systems. In some cases, the transmitter 615 may be a component of an I/O controller 910 as described with reference to FIG. 9.

The communications manager 620, the receiver 610, the transmitter 615, or various combinations thereof or various components thereof may be examples of means for performing various aspects of per-resource type CLI reference signal configurations as described herein. For example, the communications manager 620, the receiver 610, the transmitter 615, or various combinations or components thereof may support a method for performing one or more of the functions described herein.

In some examples, the communications manager 620, the receiver 610, the transmitter 615, or various combinations or components thereof may be implemented in hardware (e.g., in communications management circuitry). The hardware may include a processor, a DSP, a CPU, an ASIC, an FPGA or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 620, the receiver 610, the transmitter 615, or various combinations or components thereof may be implemented in code (e.g., as communications management software or firmware) executed by a processor. If implemented in code executed by a processor, the functions of the communications manager 620, the receiver 610, the transmitter 615, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 620 may be configured to perform various operations (e.g., receiving, obtaining, monitoring, outputting, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to obtain information, output information, or perform various other operations as described herein.

The communications manager 620 may support wireless communication at a wireless communication device in accordance with examples as disclosed herein. For example, the communications manager 620 may be configured as or otherwise support a means for receiving first information indicative of a first set of resources for performing a CLI measurement during one or more SBFD symbols. The communications manager 620 may be configured as or otherwise support a means for receiving second information indicative of a second set of resources for performing a CLI measurement during one or more non-SBFD symbols. The communications manager 620 may be configured as or otherwise support a means for performing the CLI measurement using the first set of resources or the second set of resources based on a type of symbol in which the CLI measurement is performed, where the type of symbol is a SBFD symbol or a non-subband full duplex symbol.

Additionally, or alternatively, the communications manager 620 may support wireless communication at a wireless communication device in accordance with examples as disclosed herein. For example, the communications manager 620 may be configured as or otherwise support a means for transmitting first information indicative of a first set of resources for performing a CLI measurement during one or more SBFD symbols. The communications manager 620 may be configured as or otherwise support a means for transmitting second information indicative of a second set of resources for performing a CLI measurement during one or more non-SBFD symbols.

By including or configuring the communications manager 620 in accordance with examples as described herein, the device 605 (e.g., a processor controlling or otherwise coupled with the receiver 610, the transmitter 615, the communications manager 620, or a combination thereof) may support techniques for supporting multiple resource configurations for SBFD or non-SBFD symbols, which may improve spectral efficiency, reduce resource consumption, and improve wireless communications.

Figure 7:
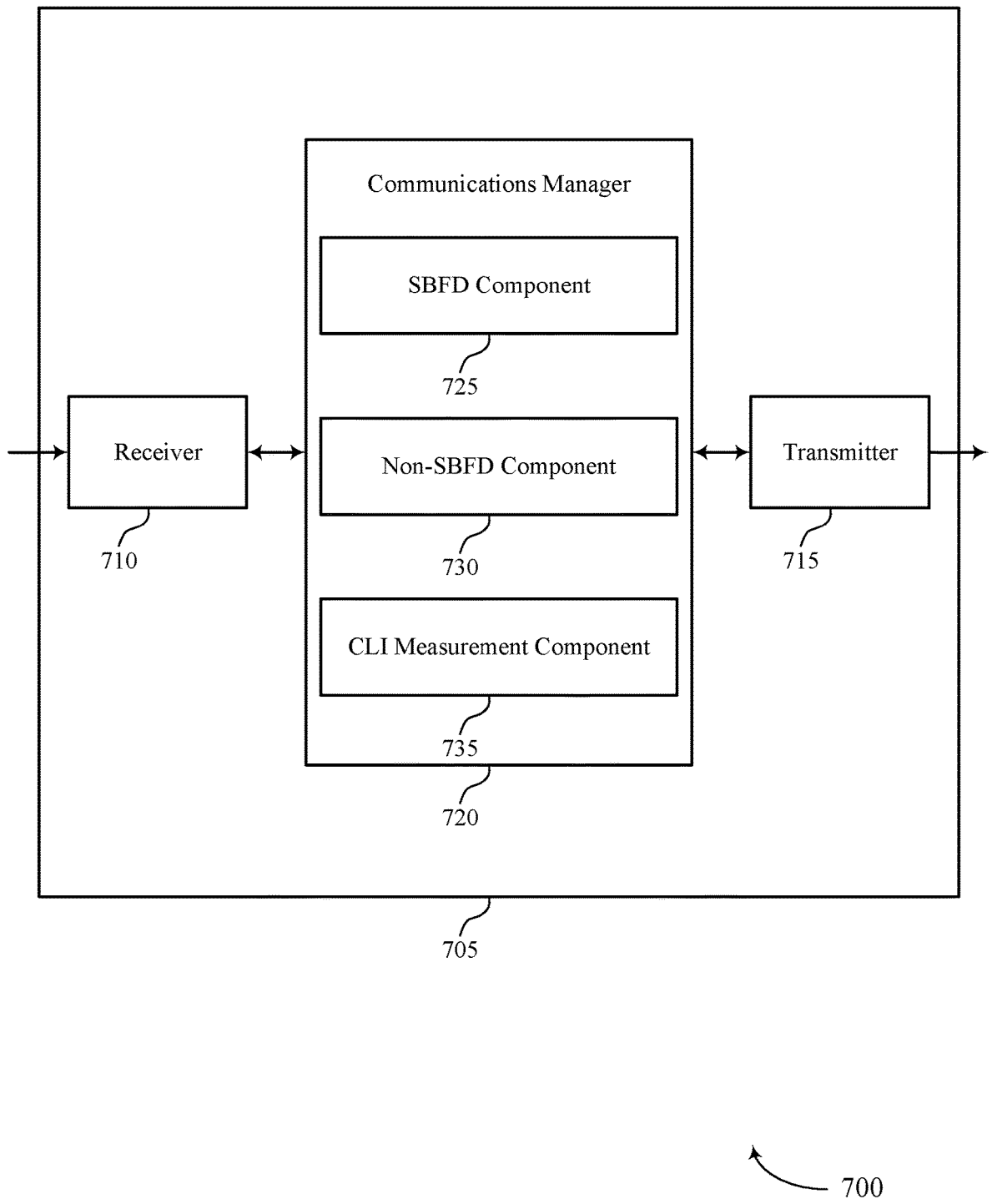

FIG. 7 illustrates a block diagram 700 of a device 705 that supports per-resource type CLI reference signal configurations in accordance with one or more aspects of the present disclosure. The device 705 may be an example of aspects of a device 605 or a wireless communication device 115 as described herein. The device 705 may include an receiver 710, an transmitter 715, and a communications manager 720. The device 705 may also include a processor. Each of these components may be in communication with one another (e.g., via one or more buses).

The receiver 710 may manage input signals for the device 705. For example, the receiver 710 may identify input signals based on an interaction with a modem, a keyboard, a mouse, a touchscreen, or a similar device. These input signals may be associated with user input or processing at other components or devices. In some cases, the receiver 710 may utilize an operating system such as iOS®, ANDROID®, MS-DOS®, MS-WINDOWS®, OS/2®, UNIX®, LINUX®, or another known operating system to handle input signals. The receiver 710 may send aspects of these input signals to other components of the device 705 for processing. For example, the receiver 710 may transmit input signals to the communications manager 720 to support per-resource type CLI reference signal configuration. In some cases, the receiver 710 may be a component of an I/O controller 910 as described with reference to FIG. 9.

The transmitter 715 may manage output signals for the device 705. For example, the transmitter 715 may receive signals from other components of the device 705, such as the communications manager 720, and may transmit these signals to other components or devices. In some specific examples, the transmitter 715 may transmit output signals for display in a user interface, for storage in a database or data store, for further processing at a server or server cluster, or for any other processes at any number of devices or systems. In some cases, the transmitter 715 may be a component of an I/O controller 910 as described with reference to FIG. 9.

The device 705, or various components thereof, may be an example of means for performing various aspects of per-resource type CLI reference signal configurations as described herein. For example, the communications manager 720 may include an SBFD component 725, a non-SBFD component 730, a CLI measurement component 735, or any combination thereof. The communications manager 720 may be an example of aspects of a communications manager 620 as described herein. In some examples, the communications manager 720, or various components thereof, may be configured to perform various operations (e.g., receiving, obtaining, monitoring, outputting, transmitting) using or otherwise in cooperation with the receiver 710, the transmitter 715, or both. For example, the communications manager 720 may receive information from the receiver 710, send information to the transmitter 715, or be integrated in combination with the receiver 710, the transmitter 715, or both to obtain information, output information, or perform various other operations as described herein.

The communications manager 720 may support wireless communication at a wireless communication device in accordance with examples as disclosed herein. The SBFD component 725 may be configured as or otherwise support a means for receiving first information indicative of a first set of resources for performing a CLI measurement during one or more SBFD symbols. The non-SBFD component 730 may be configured as or otherwise support a means for receiving second information indicative of a second set of resources for performing a CLI measurement during one or more non-SBFD symbols. The CLI measurement component 735 may be configured as or otherwise support a means for performing the CLI measurement using the first set of resources or the second set of resources based on a type of symbol in which the CLI measurement is performed, where the type of symbol is a SBFD symbol or a non-subband full duplex symbol.

Additionally, or alternatively, the communications manager 720 may support wireless communication at a wireless communication device in accordance with examples as disclosed herein. The SBFD component 725 may be configured as or otherwise support a means for transmitting first information indicative of a first set of resources for performing a CLI measurement during one or more SBFD symbols. The non-SBFD component 730 may be configured as or otherwise support a means for transmitting second information indicative of a second set of resources for performing a CLI measurement during one or more non-SBFD symbols.

Figure 8:
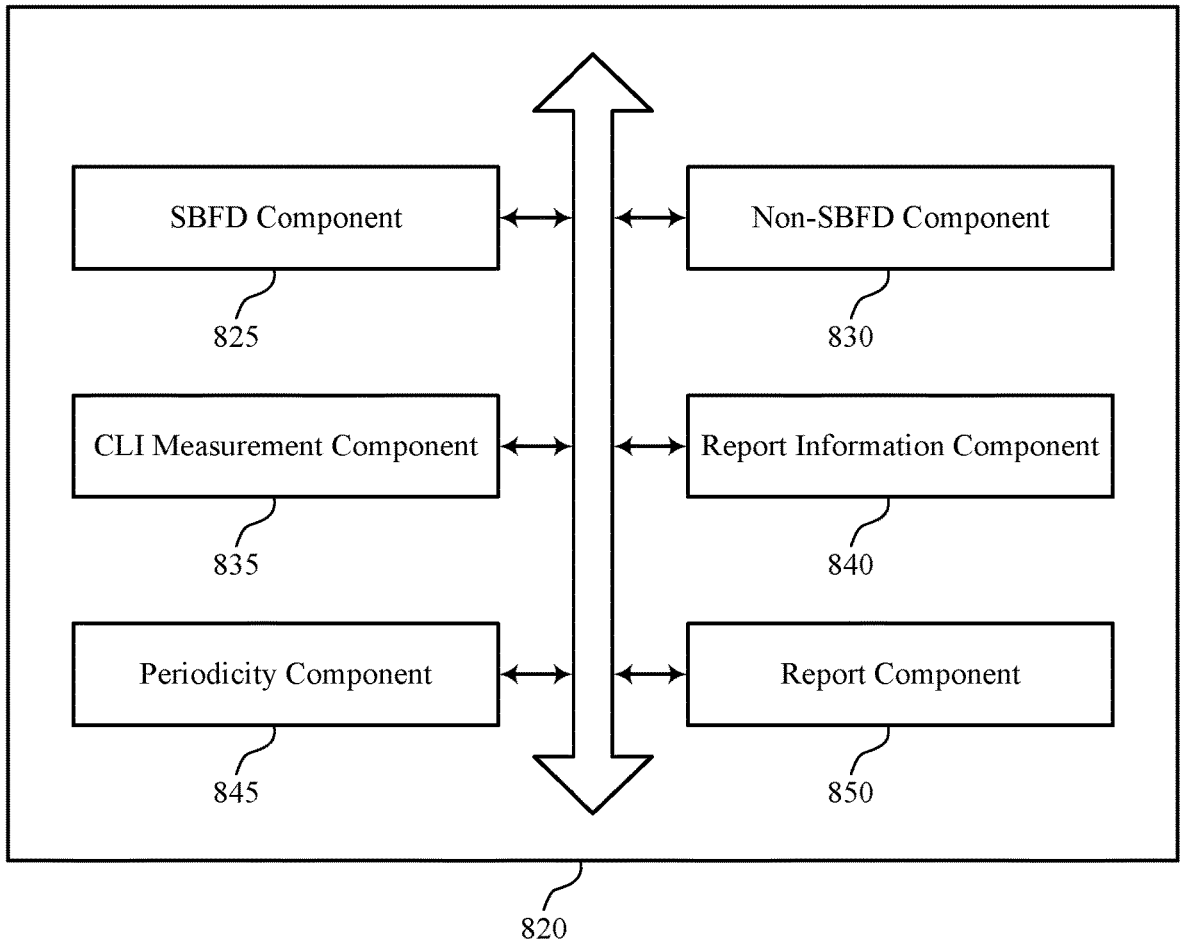
FIG. 8 illustrates a block diagram of a communications manager that supports per-resource type CLI reference signal configurations in accordance with one or more aspects of the present disclosure.

FIG. 8 illustrates a block diagram 800 of a communications manager 820 that supports per-resource type CLI reference signal configurations in accordance with one or more aspects of the present disclosure. The communications manager 820 may be an example of aspects of a communications manager 620, a communications manager 720, or both, as described herein. The communications manager 820, or various components thereof, may be an example of means for performing various aspects of per-resource type CLI reference signal configurations as described herein. For example, the communications manager 820 may include an SBFD component 825, a non-SBFD component 830, a CLI measurement component 835, a report information component 840, a periodicity component 845, a report component 850, or any combination thereof. Each of these components may communicate, directly or indirectly, with one another (e.g., via one or more buses).

The communications manager 820 may support wireless communication at a wireless communication device in accordance with examples as disclosed herein. The SBFD component 825 may be configured as or otherwise support a means for receiving first information indicative of a first set of resources for performing a CLI measurement during one or more SBFD symbols. The non-SBFD component 830 may be configured as or otherwise support a means for receiving second information indicative of a second set of resources for performing a CLI measurement during one or more non-SBFD symbols. The CLI measurement component 835 may be configured as or otherwise support a means for performing the CLI measurement using the first set of resources or the second set of resources based on a type of symbol in which the CLI measurement is performed, where the type of symbol is a SBFD symbol or a non-subband full duplex symbol.

In some examples, the report information component 840 may be configured as or otherwise support a means for receiving the first information indicative of a first additional set of resources for reporting a result of the CLI measurement during the one or more SBFD symbols. In some examples, the report information component 840 may be configured as or otherwise support a means for receiving the second information indicative of a second additional set of resources for reporting a result of the CLI measurement during the one or more non-SBFD symbols.

In some examples, the wireless communication device is a UE that supports half-duplex communications, and where the first information and the second information are received from a network entity that supports SBFD operation.

In some examples, the report component 850 may be configured as or otherwise support a means for transmitting a report indicating a result of the CLI measurement using the first additional set of resources or the second additional set of resources based on the type of symbol in which the CLI measurement is performed.

In some examples, to support performing the CLI measurement, the CLI measurement component 835 may be configured as or otherwise support a means for performing at least one of a RSSI measurement or a SINR measurement for one or more downlink subbands in a SBFD symbol to measure CLI arising from inter-subband leakage due to an uplink transmission from a neighboring wireless communication device during the SBFD symbol. In some examples, to support performing the CLI measurement, the CLI measurement component 835 may be configured as or otherwise support a means for performing at least one of a RSSI measurement or a RSRP measurement for one or more uplink subbands in the SBFD symbol to measure intra-subband CLI arising from the uplink transmission, where the wireless communication device is a user equipment (UE).

In some examples, to support performing the CLI measurement, the CLI measurement component 835 may be configured as or otherwise support a means for performing at least one of a RSSI measurement or a SINR measurement for one or more uplink subbands in a SBFD symbol to measure CLI arising from inter-subband leakage due to a downlink transmission from a neighboring wireless communication device during the SBFD symbol. In some examples, to support performing the CLI measurement, the CLI measurement component 835 may be configured as or otherwise support a means for performing at least one of a RSSI measurement or a RSRP measurement for one or more downlink subbands in the SBFD symbol to measure intra-subband CLI arising from the downlink transmission, where the wireless communication device is a network entity.

In some examples, to support performing the CLI measurement, the CLI measurement component 835 may be configured as or otherwise support a means for performing the CLI measurement during a non-SBFD symbol based on a misalignment of TDD formats applied by the wireless communication device and one or more additional wireless communication devices during the non-SBFD symbol.

In some examples, an amount of the second set of resources allocated for performing the CLI measurement during a non-SBFD symbol is based on whether TDD formats applied by the wireless communication device and one or more additional wireless communication devices during the non-SBFD symbol are aligned or misaligned.

In some examples, a first amount of the first set of resources allocated for performing the CLI measurement during a SBFD symbol is greater than a second amount of the second set of resources allocated for performing the CLI measurement during a non-SBFD symbol.

In some examples, the periodicity component 845 may be configured as or otherwise support a means for distinguishing the first information from the second information based on a periodicity of the first set of resources being associated with a corresponding periodicity of the one or more SBFD symbols.

In some examples, the first set of resources and the second set of resources are indicated per cell of a set of multiple cells. In some examples, the wireless communication device is a UE and the CLI measurement is to determine inter-UE CLI.

Additionally, or alternatively, the communications manager 820 may support wireless communication at a wireless communication device in accordance with examples as disclosed herein. In some examples, the SBFD component 825 may be configured as or otherwise support a means for transmitting first information indicative of a first set of resources for performing a CLI measurement during one or more SBFD symbols. In some examples, the non-SBFD component 830 may be configured as or otherwise support a means for transmitting second information indicative of a second set of resources for performing a CLI measurement during one or more non-SBFD symbols.

In some examples, the report information component 840 may be configured as or otherwise support a means for transmitting the first information indicative of a first additional set of resources for reporting a result of the CLI measurement during the one or more SBFD symbols. In some examples, the report information component 840 may be configured as or otherwise support a means for transmitting the second information indicative of a second additional set of resources for reporting a result of the CLI measurement during the one or more non-SBFD symbols.

In some examples, the report information component 840 may be configured as or otherwise support a means for the wireless communication device is a network entity that supports SBFD operation, and where the first information and the second information are transmitted to a UE that supports half-duplex operation.

In some examples, the report component 850 may be configured as or otherwise support a means for receiving a report indicating a result of the CLI measurement using the first additional set of resources or the second additional set of resources based on a type of symbol in which the CLI measurement is performed.

In some examples, an amount of the second set of resources allocated for performing the CLI measurement during a non-SBFD symbol is based on whether TDD formats applied by the wireless communication device and one or more additional wireless communication devices during the non-SBFD symbol are aligned or misaligned.

In some examples, a first amount of the first set of resources allocated for performing the CLI measurement during a SBFD symbol is greater than a second amount of the second set of resources allocated for performing the CLI measurement during a non-SBFD symbol.

In some examples, the first set of resources and the second set of resources are indicated per cell of a set of multiple cells. In some examples, the wireless communication device is a network entity and the CLI measurement is to determine inter-network entity CLI.

Figure 9:
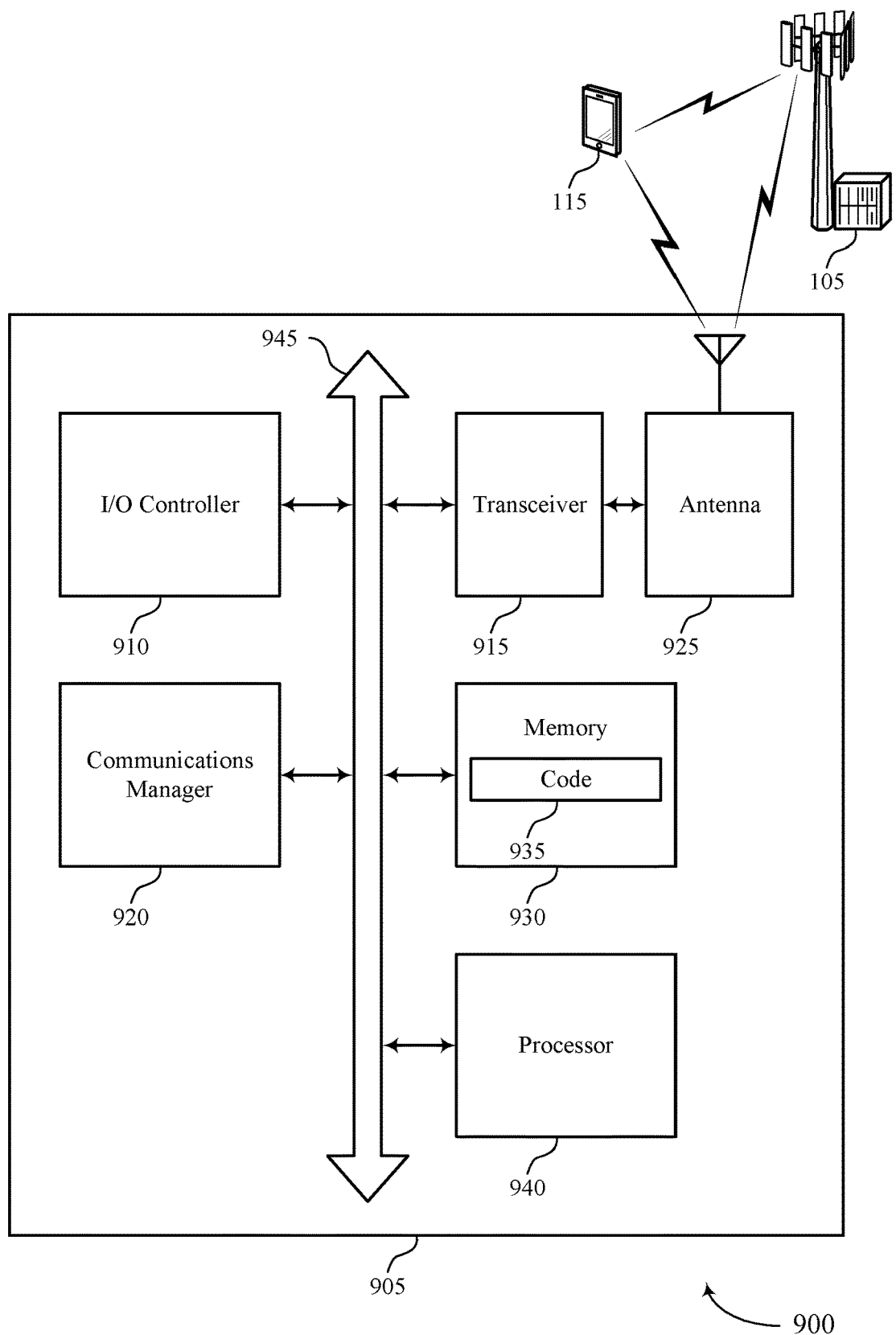
FIG. 9 illustrates a diagram of a system including a device that supports per-resource type CLI reference signal configurations in accordance with one or more aspects of the present disclosure.

FIG. 9 illustrates a diagram of a system 900 including a device 905 that supports per-resource type CLI reference signal configurations in accordance with one or more aspects of the present disclosure. The device 905 may be an example of or include the components of a device 605, a device 705, or a wireless communication device as described herein. The device 905 may include components for bi-directional voice and data communications including components for transmitting and receiving communications, such as a communications manager 920, an I/O controller 910, a transceiver 915, an antenna 925, a memory 930, code 935 coupled with the memory 930, and a processor 940. These components may be in electronic communication or otherwise coupled (e.g., operatively, communicatively, functionally, electronically, electrically) via one or more buses (e.g., a bus 945).

The I/O controller 910 may manage input signals and output signals for the device 905. The I/O controller 910 may also manage peripherals not integrated into the device 905. In some cases, the I/O controller 910 may represent a physical connection or port to an external peripheral. In some cases, the I/O controller 910 may utilize an operating system such as iOS®, ANDROID®, MS-DOS®, MS-WINDOWS®, OS/2®, UNIX®, LINUX®, or another known operating system. Additionally, or alternatively, the I/O controller 910 may represent or interact with a modem, a keyboard, a mouse, a touchscreen, or a similar device. In some cases, the I/O controller 910 may be implemented as part of a processor. In some examples, a user may interact with the device 905 via the I/O controller 910 or via hardware components controlled by the I/O controller 910.

In some cases, the device 905 may include a single antenna 925. However, in some other cases, the device 905 may have more than one antenna 925, which may be capable of concurrently transmitting or receiving multiple wireless transmissions. The transceiver 915 may communicate bi-directionally, via the one or more antennas 925, wired, or wireless links as described herein. For example, the transceiver 915 may represent a wireless transceiver and may communicate bi-directionally with another wireless transceiver. The transceiver 915 may also include a modem to modulate the packets, to provide the modulated packets to one or more antennas 925 for transmission, and to demodulate packets received from the one or more antennas 925. The transceiver 915, or the transceiver 915 and one or more antennas 925, may be an example of a transmitter 715, a transmitter 815, or any combination thereof or component thereof, as described herein.

The memory 930 may include RAM and ROM. The memory 930 may store computer-readable, computer-executable code 935 including instructions that, when executed by the processor 940, cause the device 905 to perform various functions described herein. The code 935 may be stored in a non-transitory computer-readable medium such as system memory or another type of memory. In some cases, the code 935 may not be directly executable by the processor 940 but may cause a computer (e.g., when compiled and executed) to perform functions described herein. In some cases, the memory 930 may contain, among other things, a BIOS which may control basic hardware or software operation such as the interaction with peripheral components or devices.

The processor 940 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 940 may be configured to operate a memory array using a memory controller. In some other cases, a memory controller may be integrated into the processor 940. The processor 940 may be configured to execute computer-readable instructions stored in a memory (e.g., the memory 930) to cause the device 905 to perform various functions (e.g., functions or tasks supporting mobile IAB connectivity). For example, the device 905 or a component of the device 905 may include a processor 940 and memory 930 coupled with or to the processor 940, the processor 940 and memory 930 configured to perform various functions described herein.

The communications manager 920 may support wireless communication by a mobile wireless node in accordance with examples as disclosed herein. For example, the communications manager 920 may be configured as or otherwise support a means for transmitting, to a parent wireless node, a control message indicating one or more network connectivity modes supported by the mobile wireless node, the one or more network connectivity modes for providing network connectivity to one or more UEs via the mobile wireless node when wireless backhaul connectivity is lost between the mobile wireless node and the parent wireless node. The communications manager 920 may be configured as or otherwise support a means for receiving, from the parent wireless node, a reply message indicating authorization to use at least a first network connectivity mode of the one or more network connectivity modes. The communications manager 920 may be configured as or otherwise support a means for communicating one or more messages with a first UE of the one or more UEs in accordance with the first network connectivity mode.

By including or configuring the communications manager 920 in accordance with examples as described herein, the device 905 may support techniques for mobile IAB connectivity, which may increase signaling throughput, increase coverage for a mobile IAB node, and improve communications between the mobile IAB node and one or more UEs.

In some examples, the communications manager 920 may be configured to perform various operations (e.g., receiving, monitoring, transmitting) using or otherwise in cooperation with the transceiver 915, the one or more antennas 925, or any combination thereof. Although the communications manager 920 is illustrated as a separate component, in some examples, one or more functions described with reference to the communications manager 920 may be supported by or performed by the processor 940, the memory 930, the code 935, or any combination thereof. For example, the code 935 may include instructions executable by the processor 940 to cause the device 905 to perform various aspects of mobile IAB connectivity as described herein, or the processor 940 and the memory 930 may be otherwise configured to perform or support such operations.

Figure 10:
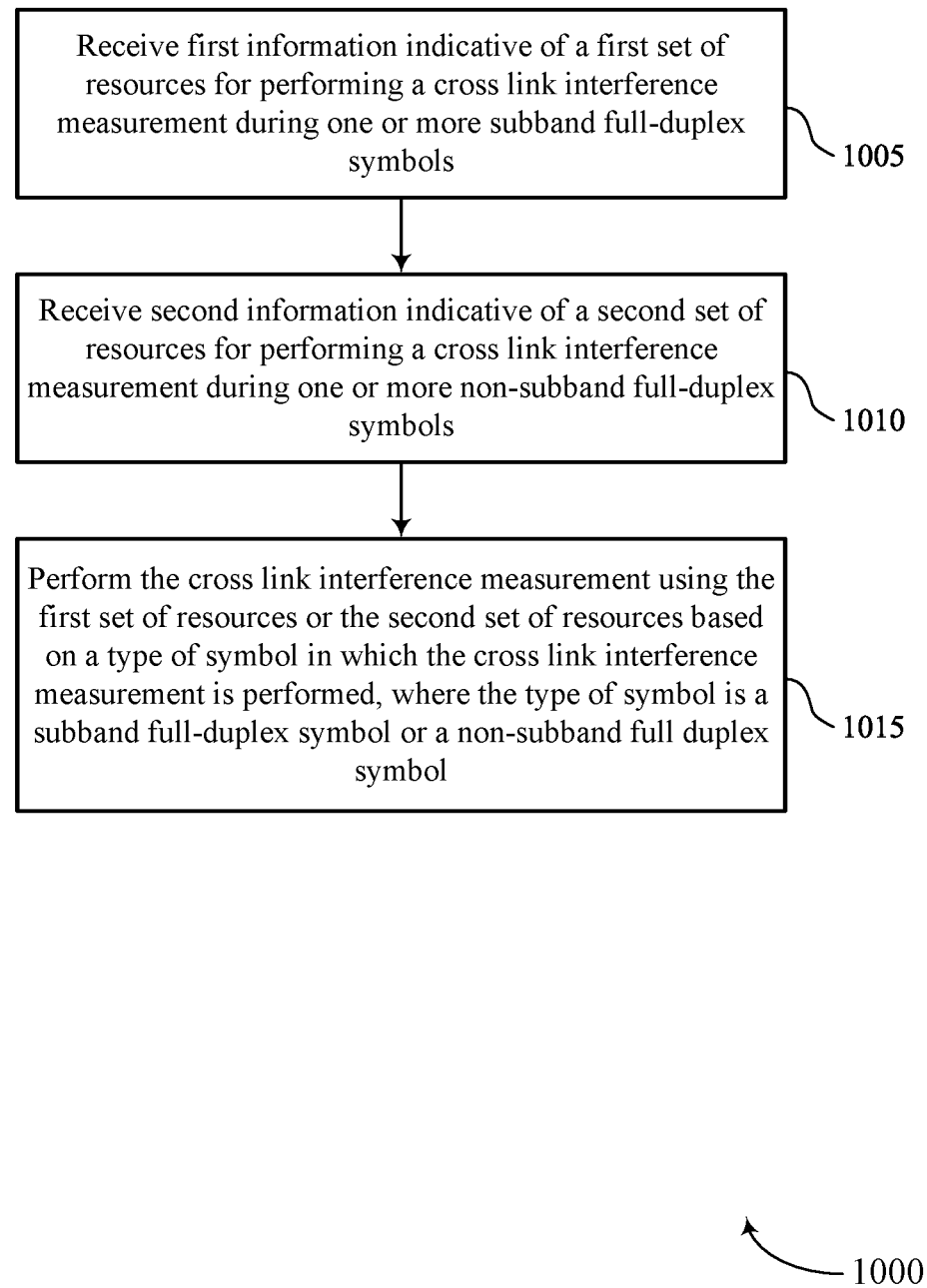
FIGS. 10 through 13 illustrate flowcharts showing methods that support per-resource type CLI reference signal configurations in accordance with one or more aspects of the present disclosure.

FIG. 10 illustrates a flowchart showing a method 1000 that supports per-resource type CLI reference signal configurations in accordance with one or more aspects of the present disclosure. The operations of the method 1000 may be implemented by a wireless communication device or its components as described herein. For example, the operations of the method 1000 may be performed by a wireless communication device as described with reference to FIGS. 1 through 9. In some examples, a wireless communication device may execute a set of instructions to control the functional elements of the wireless communication device to perform the described functions. Additionally, or alternatively, the wireless communication device may perform aspects of the described functions using special-purpose hardware.

At 1005, the method may include receiving first information indicative of a first set of resources for performing a CLI measurement during one or more SBFD symbols. The operations of 1005 may be performed in accordance with examples as disclosed herein. In some examples, aspects of the operations of 1005 may be performed by an SBFD component 825 as described with reference to FIG. 8.

At 1010, the method may include receiving second information indicative of a second set of resources for performing a CLI measurement during one or more non-SBFD symbols. The operations of 1010 may be performed in accordance with examples as disclosed herein. In some examples, aspects of the operations of 1010 may be performed by a non-SBFD component 830 as described with reference to FIG. 8.

At 1015, the method may include performing the CLI measurement using the first set of resources or the second set of resources based on a type of symbol in which the CLI measurement is performed, where the type of symbol is a SBFD symbol or a non-subband full duplex symbol. The operations of 1015 may be performed in accordance with examples as disclosed herein. In some examples, aspects of the operations of 1015 may be performed by a CLI measurement component 835 as described with reference to FIG. 8.

Figure 11:
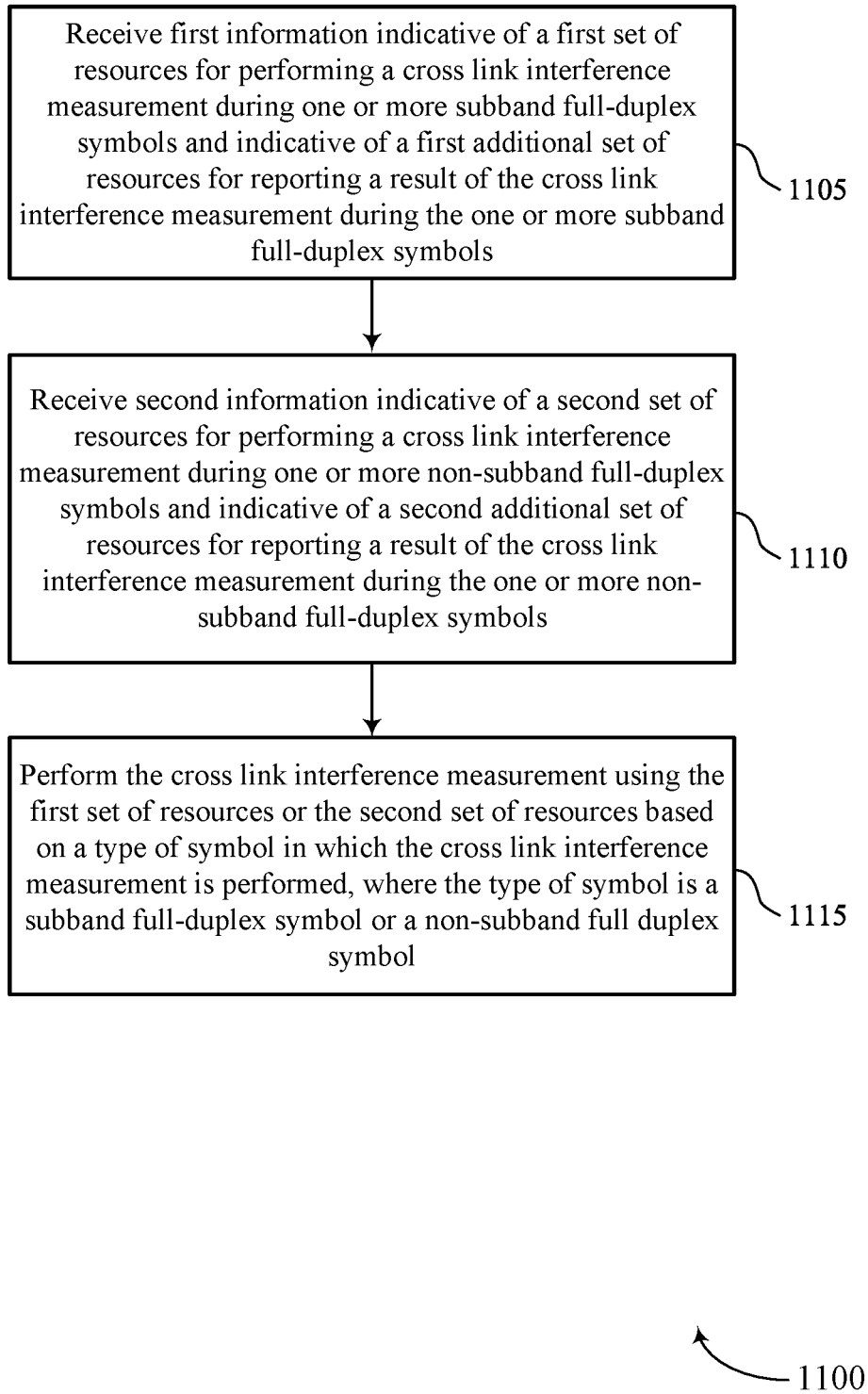

FIG. 11 illustrates a flowchart showing a method 1100 that supports per-resource type CLI reference signal configurations in accordance with one or more aspects of the present disclosure. The operations of the method 1100 may be implemented by a wireless communication device or its components as described herein. For example, the operations of the method 1100 may be performed by a wireless communication device as described with reference to FIGS. 1 through 9. In some examples, a wireless communication device may execute a set of instructions to control the functional elements of the wireless communication device to perform the described functions. Additionally, or alternatively, the wireless communication device may perform aspects of the described functions using special-purpose hardware.

At 1105, the method may include receiving first information indicative of a first set of resources for performing a CLI measurement during one or more SBFD symbols and indicative of a first additional set of resources for reporting a result of the CLI measurement during the one or more SBFD symbols. The operations of 1105 may be performed in accordance with examples as disclosed herein. In some examples, aspects of the operations of 1105 may be performed by an SBFD component 825 as described with reference to FIG. 8.

At 1110, the method may include receiving second information indicative of a second set of resources for performing a CLI measurement during one or more non-SBFD symbols and indicative of a first additional set of resources for reporting a result of the CLI measurement during the one or more SBFD symbols. The operations of 1110 may be performed in accordance with examples as disclosed herein. In some examples, aspects of the operations of 1110 may be performed by a non-SBFD component 830 as described with reference to FIG. 8.

At 1115, the method may include performing the CLI measurement using the first set of resources or the second set of resources based on a type of symbol in which the CLI measurement is performed, where the type of symbol is a SBFD symbol or a non-subband full duplex symbol. The operations of 1115 may be performed in accordance with examples as disclosed herein. In some examples, aspects of the operations of 1115 may be performed by a CLI measurement component 835 as described with reference to FIG. 8.

Figure 12:
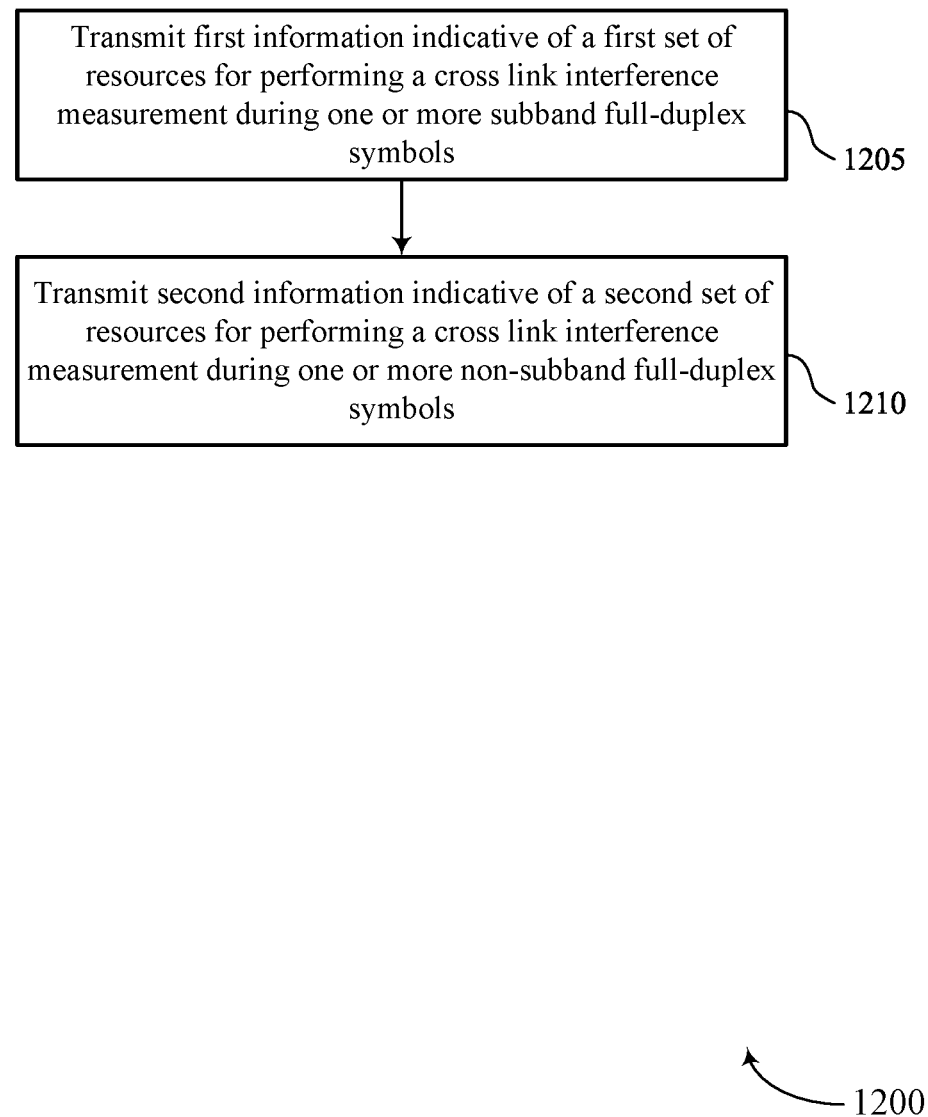

FIG. 12 illustrates a flowchart showing a method 1200 that supports per-resource type CLI reference signal configurations in accordance with one or more aspects of the present disclosure. The operations of the method 1200 may be implemented by a wireless communication device or its components as described herein. For example, the operations of the method 1200 may be performed by a wireless communication device as described with reference to FIGS. 1 through 9. In some examples, a wireless communication device may execute a set of instructions to control the functional elements of the wireless communication device to perform the described functions. Additionally, or alternatively, the wireless communication device may perform aspects of the described functions using special-purpose hardware.

At 1205, the method may include transmitting first information indicative of a first set of resources for performing a CLI measurement during one or more SBFD symbols. The operations of 1205 may be performed in accordance with examples as disclosed herein. In some examples, aspects of the operations of 1205 may be performed by an SBFD component 825 as described with reference to FIG. 8.

At 1210, the method may include transmitting second information indicative of a second set of resources for performing a CLI measurement during one or more non-SBFD symbols. The operations of 1210 may be performed in accordance with examples as disclosed herein. In some examples, aspects of the operations of 1210 may be performed by a non-SBFD component 830 as described with reference to FIG. 8.

Figure 13:
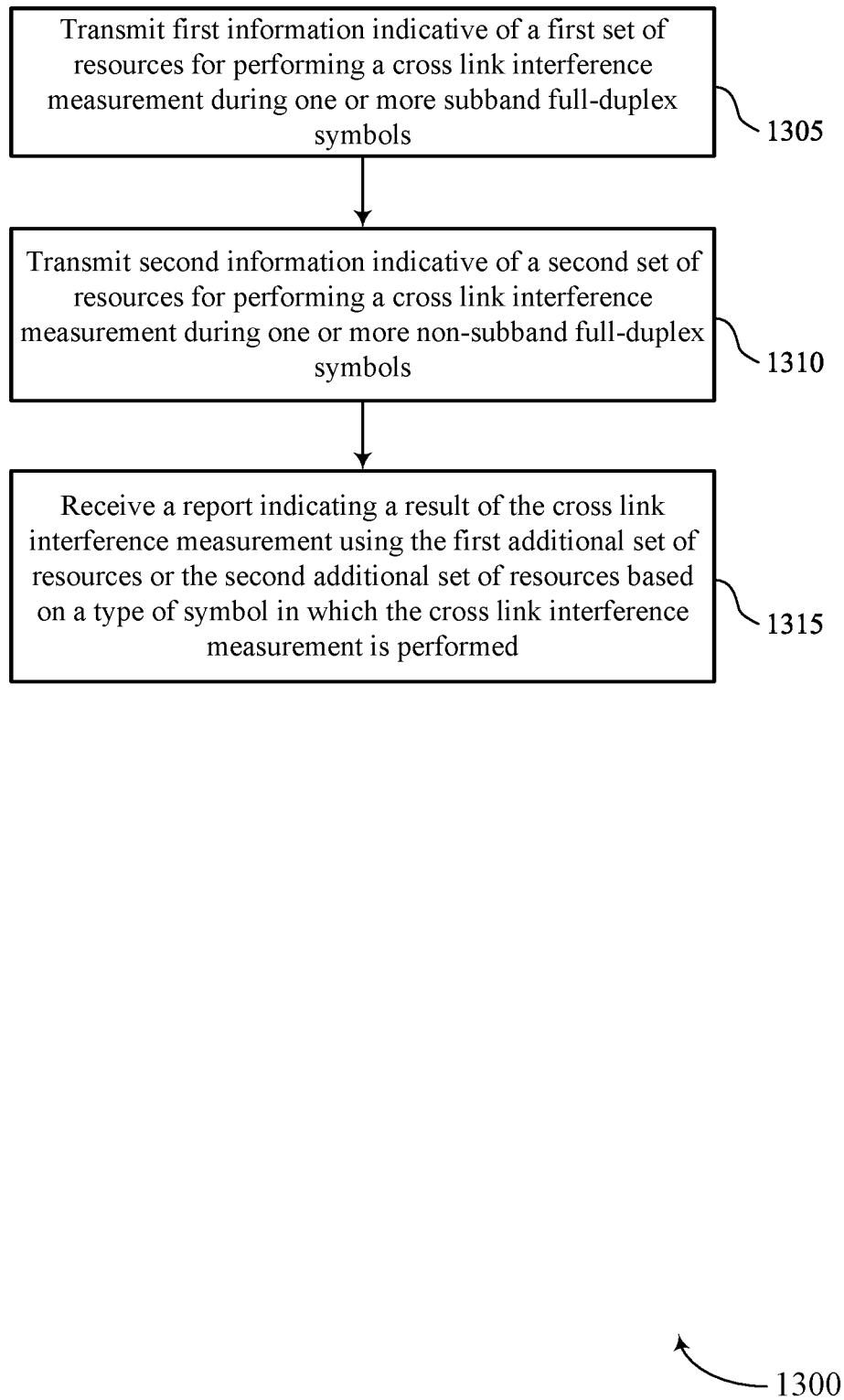

FIG. 13 illustrates a flowchart showing a method 1300 that supports per-resource type CLI reference signal configurations in accordance with one or more aspects of the present disclosure. The operations of the method 1300 may be implemented by a wireless communication device or its components as described herein. For example, the operations of the method 1300 may be performed by a wireless communication device as described with reference to FIGS. 1 through 9. In some examples, a wireless communication device may execute a set of instructions to control the functional elements of the wireless communication device to perform the described functions. Additionally, or alternatively, the wireless communication device may perform aspects of the described functions using special-purpose hardware.

At 1305, the method may include transmitting first information indicative of a first set of resources for performing a CLI measurement during one or more SBFD symbols. The operations of 1305 may be performed in accordance with examples as disclosed herein. In some examples, aspects of the operations of 1305 may be performed by an SBFD component 825 as described with reference to FIG. 8.

At 1310, the method may include transmitting second information indicative of a second set of resources for performing a CLI measurement during one or more non-SBFD symbols. The operations of 1310 may be performed in accordance with examples as disclosed herein. In some examples, aspects of the operations of 1310 may be performed by a non-SBFD component 830 as described with reference to FIG. 8.

At 1315, the method may include receiving a report indicating a result of the CLI measurement using the first additional set of resources or the second additional set of resources based on a type of symbol in which the CLI measurement is performed. The operations of 1315 may be performed in accordance with examples as disclosed herein. In some examples, aspects of the operations of 1315 may be performed by a report component 850 as described with reference to FIG. 8.

The following provides an overview of aspects of the present disclosure:

Aspect 1: A method for wireless communication at a wireless communication device, comprising: receiving first information indicative of a first set of resources for performing a CLI measurement during one or more SBFD symbols; receiving second information indicative of a second set of resources for performing a CLI measurement during one or more non-SBFD symbols; and performing the CLI measurement using the first set of resources or the second set of resources based at least in part on a type of symbol in which the CLI measurement is performed, wherein the type of symbol is a SBFD symbol or a non-subband full duplex symbol.

Aspect 2: The method of aspect 1, further comprising: receiving the first information indicative of a first additional set of resources for reporting a result of the CLI measurement during the one or more SBFD symbols; and receiving the second information indicative of a second additional set of resources for reporting a result of the CLI measurement during the one or more non-SBFD symbols.

Aspect 3: The method of aspect 2, wherein the wireless communication device is a UE that supports half-duplex communications, and wherein the first information and the second information are received from a network entity that supports SBFD operation.

Aspect 4: The method of any of aspects 2 through 3, further comprising: transmitting a report indicating a result of the CLI measurement using the first additional set of resources or the second additional set of resources based at least in part on the type of symbol in which the CLI measurement is performed.

Aspect 5: The method of any of aspects 1 through 4, wherein performing the CLI measurement comprises: performing at least one of a RSSI measurement or a SINR measurement for one or more downlink subbands in a SBFD symbol to measure CLI arising from inter-subband leakage due to an uplink transmission from a neighboring wireless communication device during the SBFD symbol; and performing at least one of a RSSI measurement or a RSRP measurement for one or more uplink subbands in the SBFD symbol to measure intra-subband CLI arising from the uplink transmission, wherein the wireless communication device is a UE.

Aspect 6: The method of any of aspects 1 through 5, wherein performing the CLI measurement comprises: performing at least one of a RSSI measurement or a SINR measurement for one or more uplink subbands in a SBFD symbol to measure CLI arising from inter-subband leakage due to a downlink transmission from a neighboring wireless communication device during the SBFD symbol; and performing at least one of a RSSI measurement or a RSRP measurement for one or more downlink subbands in the SBFD symbol to measure intra-subband CLI arising from the downlink transmission, wherein the wireless communication device is a network entity.

Aspect 7: The method of any of aspects 1 through 6, wherein performing the CLI measurement comprises: performing the CLI measurement during a non-SBFD symbol based at least in part on a misalignment of TDD formats applied by the wireless communication device and one or more additional wireless communication devices during the non-SBFD symbol.

Aspect 8: The method of any of aspects 1 through 7, wherein an amount of the second set of resources allocated for performing the CLI measurement during a non-SBFD symbol is based on whether TDD formats applied by the wireless communication device and one or more additional wireless communication devices during the non-SBFD symbol are aligned or misaligned.

Aspect 9: The method of any of aspects 1 through 8, wherein a first amount of the first set of resources allocated for performing the CLI measurement during a SBFD symbol is greater than a second amount of the second set of resources allocated for performing the CLI measurement during a non-SBFD symbol.

Aspect 10: The method of any of aspects 1 through 9, further comprising: distinguishing the first information from the second information based at least in part on a periodicity of the first set of resources being associated with a corresponding periodicity of the one or more SBFD symbols.

Aspect 11: The method of any of aspects 1 through 10, wherein the first set of resources and the second set of resources are indicated per cell of a plurality of cells.

Aspect 12: The method of any of aspects 1 through 11, wherein the wireless communication device is a UE and the CLI measurement is to determine inter-UE CLI.

Aspect 13: A method for wireless communication at a wireless communication device, comprising: transmitting first information indicative of a first set of resources for performing a CLI measurement during one or more SBFD symbols; and transmitting second information indicative of a second set of resources for performing a CLI measurement during one or more non-SBFD symbols.

Aspect 14: The method of aspect 13, further comprising: transmitting the first information indicative of a first additional set of resources for reporting a result of the CLI measurement during the one or more SBFD symbols; and transmitting the second information indicative of a second additional set of resources for reporting a result of the CLI measurement during the one or more non-SBFD symbols.

Aspect 15: The method of aspect 14, further comprising: the wireless communication device is a network entity that supports SBFD operation, and wherein the first information and the second information are transmitted to a UE that supports half-duplex operation.

Aspect 16: The method of any of aspects 14 through 15, further comprising: receiving a report indicating a result of the CLI measurement using the first additional set of resources or the second additional set of resources based at least in part on a type of symbol in which the CLI measurement is performed.

Aspect 17: The method of any of aspects 13 through 16, wherein an amount of the second set of resources allocated for performing the CLI measurement during a non-SBFD symbol is based on whether TDD formats applied by the wireless communication device and one or more additional wireless communication devices during the non-SBFD symbol are aligned or misaligned.

Aspect 18: The method of any of aspects 13 through 17, wherein a first amount of the first set of resources allocated for performing the CLI measurement during a SBFD symbol is greater than a second amount of the second set of resources allocated for performing the CLI measurement during a non-SBFD symbol.

Aspect 19: The method of any of aspects 13 through 18, wherein the first set of resources and the second set of resources are indicated per cell of a plurality of cells.

Aspect 20: The method of any of aspects 13 through 19, wherein the wireless communication device is a network entity and the CLI measurement is to determine inter-network entity CLI.

Aspect 21: An apparatus for wireless communication at a wireless communication device, comprising a processor; memory coupled with the processor; and instructions stored in the memory and executable by the processor to cause the apparatus to perform a method of any of aspects 1 through 12.

Aspect 22: An apparatus for wireless communication at a wireless communication device, comprising at least one means for performing a method of any of aspects 1 through 12.

Aspect 23: A non-transitory computer-readable medium storing code for wireless communication at a wireless communication device, the code comprising instructions executable by a processor to perform a method of any of aspects 1 through 12.

Aspect 24: An apparatus for wireless communication at a wireless communication device, comprising a processor; memory coupled with the processor; and instructions stored in the memory and executable by the processor to cause the apparatus to perform a method of any of aspects 13 through 20.

Aspect 25: An apparatus for wireless communication at a wireless communication device, comprising at least one means for performing a method of any of aspects 13 through 20.

Aspect 26: A non-transitory computer-readable medium storing code for wireless communication at a wireless communication device, the code comprising instructions executable by a processor to perform a method of any of aspects 13 through 20.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed using a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor but, in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented using hardware, software executed by a processor, firmware, or any combination thereof. If implemented using software executed by a processor, the functions may be stored as or transmitted using one or more instructions or code of a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one location to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc. Disks may reproduce data magnetically, and discs may reproduce data optically using lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a variety of actions and, therefore, "determining" can include calculating, computing, processing, deriving, investigating, looking up (such as via looking up in a table, a database or another data structure), ascertaining and the like. Also, "determining" can include receiving (e.g., receiving information), accessing (e.g., accessing data stored in memory) and the like. Also, "determining" can include resolving, obtaining, selecting, choosing, establishing, and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. An apparatus for wireless communication at a wireless communication device, comprising:
   a processor;
   memory coupled with the processor; and
   instructions stored in the memory and executable by the processor to cause the apparatus to:
      receive first information indicative of a first set of resources for performing a cross link interference measurement during one or more subband full-duplex symbols;
      receive second information indicative of a second set of resources for performing a cross link interference measurement during one or more non-subband full-duplex symbols; and
      perform the cross link interference measurement using the first set of resources or the second set of resources based at least in part on a type of symbol in which the cross link interference measurement is to be performed, wherein the type of symbol is a subband full-duplex symbol or a non-subband full duplex symbol.

2. The apparatus of claim 1, wherein the instructions are further executable by the processor to cause the apparatus to:
   receive the first information indicative of a first additional set of resources for reporting a result of the cross link interference measurement during the one or more subband full-duplex symbols; and
   receive the second information indicative of a second additional set of resources for reporting a result of the cross link interference measurement during the one or more non-subband full-duplex symbols.

3. The apparatus of claim 2, wherein the wireless communication device is a user equipment (UE) that supports half-duplex communications, and wherein the first information and the second information are received from a network entity that supports subband full-duplex operation.

4. The apparatus of claim 2, wherein the instructions are further executable by the processor to cause the apparatus to:

transmit a report indicating a result of the cross link interference measurement using the first additional set of resources or the second additional set of resources based at least in part on the type of symbol in which the cross link interference measurement is performed.

5. The apparatus of claim 1, wherein the instructions to perform the cross link interference measurement are executable by the processor to cause the apparatus to:
perform at least one of a received signal strength indicator measurement or a signal interference-to-noise ratio measurement for one or more downlink subbands in a subband full-duplex symbol to measure cross link interference arising from inter-subband leakage due to an uplink transmission from a neighboring wireless communication device during the subband full-duplex symbol; and
perform at least one of a received signal strength indicator measurement or a reference signal received power measurement for one or more uplink subbands in the subband full-duplex symbol to measure intra-subband cross link interference arising from the uplink transmission, wherein the wireless communication device is a user equipment (UE).

6. The apparatus of claim 1, wherein the instructions to perform the cross link interference measurement are executable by the processor to cause the apparatus to:
perform at least one of a received signal strength indicator measurement or a signal interference-to-noise ratio measurement for one or more uplink subbands in a subband full-duplex symbol to measure cross link interference arising from inter-subband leakage due to a downlink transmission from a neighboring wireless communication device during the subband full-duplex symbol; and
perform at least one of a received signal strength indicator measurement or a reference signal received power measurement for one or more downlink subbands in the subband full-duplex symbol to measure intra-subband cross link interference arising from the downlink transmission, wherein the wireless communication device is a network entity.

7. The apparatus of claim 1, wherein the instructions to perform the cross link interference measurement are executable by the processor to cause the apparatus to:
perform the cross link interference measurement during a non-subband full-duplex symbol based at least in part on a misalignment of time division duplex formats applied by the wireless communication device and one or more additional wireless communication devices during the non-subband full-duplex symbol.

8. The apparatus of claim 1, wherein an amount of the second set of resources allocated for performing the cross link interference measurement during a non-subband full-duplex symbol is based on whether time division duplex formats applied by the wireless communication device and one or more additional wireless communication devices during the non-subband full-duplex symbol are aligned or misaligned.

9. The apparatus of claim 1, wherein a first amount of the first set of resources allocated for performing the cross link interference measurement during a subband full-duplex symbol is greater than a second amount of the second set of resources allocated for performing the cross link interference measurement during a non-subband full-duplex symbol.

10. The apparatus of claim 1, wherein the instructions are further executable by the processor to cause the apparatus to:

distinguish the first information from the second information based at least in part on a periodicity of the first set of resources being associated with a corresponding periodicity of the one or more subband full-duplex symbols.

11. The apparatus of claim 1, wherein the first set of resources and the second set of resources are indicated per cell of a plurality of cells.

12. The apparatus of claim 1, wherein the wireless communication device is a user equipment (UE) and the cross link interference measurement is to determine inter-UE cross link interference.

13. An apparatus for wireless communication at a wireless communication device, comprising:
a processor;
memory coupled with the processor; and
instructions stored in the memory and executable by the processor to cause the apparatus to:
transmit first information indicative of a first set of resources for performing a cross link interference measurement during one or more subband full-duplex symbols; and
transmit second information indicative of a second set of resources for performing a cross link interference measurement during one or more non-subband full-duplex symbols,
wherein the first information and the second information collectively configure performance of the cross link interference measurement using the first set of resources or the second set of resources based at least in part on a type of symbol in which the cross link interference measurement is to be performed, wherein the type of symbol is a subband full-duplex symbol or a non-subband full duplex symbol.

14. The apparatus of claim 13, wherein the instructions are further executable by the processor to cause the apparatus to:
transmit the first information indicative of a first additional set of resources for reporting a result of the cross link interference measurement during the one or more subband full-duplex symbols; and
transmit the second information indicative of a second additional set of resources for reporting a result of the cross link interference measurement during the one or more non-subband full-duplex symbols.

15. The apparatus of claim 14, wherein the wireless communication device is a network entity that supports subband full-duplex operation, and wherein the first information and the second information are transmitted to a user equipment (UE) that supports half-duplex operation.

16. The apparatus of claim 14, wherein the instructions are further executable by the processor to cause the apparatus to:
receive a report indicating a result of the cross link interference measurement using the first additional set of resources or the second additional set of resources based at least in part on a type of symbol in which the cross link interference measurement is performed.

17. The apparatus of claim 13, wherein an amount of the second set of resources allocated for performing the cross link interference measurement during a non-subband full-duplex symbol is based on whether time division duplex formats applied by the wireless communication device and one or more additional wireless communication devices during the non-subband full-duplex symbol are aligned or misaligned.

18. The apparatus of claim 13, wherein a first amount of the first set of resources allocated for performing the cross link interference measurement during a subband full-duplex symbol is greater than a second amount of the second set of resources allocated for performing the cross link interference measurement during a non-subband full-duplex symbol.

19. The apparatus of claim 13, wherein the first set of resources and the second set of resources are indicated per cell of a plurality of cells.

20. The apparatus of claim 13, wherein the wireless communication device is a network entity and the cross link interference measurement is to determine inter-network entity cross link interference.

21. A method for wireless communication at a wireless communication device, comprising:
receiving first information indicative of a first set of resources for performing a cross link interference measurement during one or more subband full-duplex symbols;
receiving second information indicative of a second set of resources for performing a cross link interference measurement during one or more non-subband full-duplex symbols; and
performing the cross link interference measurement using the first set of resources or the second set of resources based at least in part on a type of symbol in which the cross link interference measurement is to be performed, wherein the type of symbol is a subband full-duplex symbol or a non-subband full duplex symbol.

22. The method of claim 21, further comprising:
receiving the first information indicative of a first additional set of resources for reporting a result of the cross link interference measurement during the one or more subband full-duplex symbols; and
receiving the second information indicative of a second additional set of resources for reporting a result of the cross link interference measurement during the one or more non-subband full-duplex symbols.

23. The method of claim 22, wherein the wireless communication device is a user equipment (UE) that supports half-duplex communications, and wherein the first information and the second information are received from a network entity that supports subband full-duplex operation.

24. The method of claim 22, further comprising:
transmitting a report indicating a result of the cross link interference measurement using the first additional set of resources or the second additional set of resources based at least in part on the type of symbol in which the cross link interference measurement is performed.

25. The method of claim 21, wherein performing the cross link interference measurement comprises:
performing at least one of a received signal strength indicator measurement or a signal interference-to-noise ratio measurement for one or more downlink subbands in a subband full-duplex symbol to measure cross link interference arising from inter-subband leakage due to an uplink transmission from a neighboring wireless communication device during the subband full-duplex symbol; and
performing at least one of a received signal strength indicator measurement or a reference signal received power measurement for one or more uplink subbands in the subband full-duplex symbol to measure intra-subband cross link interference arising from the uplink transmission, wherein the wireless communication device is a user equipment (UE).

26. A method for wireless communication at a wireless communication device, comprising:
transmitting first information indicative of a first set of resources for performing a cross link interference measurement during one or more subband full-duplex symbols; and
transmitting second information indicative of a second set of resources for performing a cross link interference measurement during one or more non-subband full-duplex symbols,
wherein the first information and the second information collectively configure performance of the cross link interference measurement using the first set of resources or the second set of resources based at least in part on a type of symbol in which the cross link interference measurement is to be performed, wherein the type of symbol is a subband full-duplex symbol or a non-subband full duplex symbol.

27. The method of claim 26, further comprising:
transmitting the first information indicative of a first additional set of resources for reporting a result of the cross link interference measurement during the one or more subband full-duplex symbols; and
transmitting the second information indicative of a second additional set of resources for reporting a result of the cross link interference measurement during the one or more non-subband full-duplex symbols.

28. The method of claim 27, further comprising:
the wireless communication device is a network entity that supports subband full-duplex operation, and wherein the first information and the second information are transmitted to a user equipment (UE) that supports half-duplex operation.

29. The method of claim 27, further comprising:
receiving a report indicating a result of the cross link interference measurement using the first additional set of resources or the second additional set of resources based at least in part on a type of symbol in which the cross link interference measurement is performed.

30. The method of claim 26, wherein an amount of the second set of resources allocated for performing the cross link interference measurement during a non-subband full-duplex symbol is based on whether time division duplex formats applied by the wireless communication device and one or more additional wireless communication devices during the non-subband full-duplex symbol are aligned or misaligned.

* * * * *